United States Patent
Shreevastav et al.

(10) Patent No.: US 12,323,365 B2
(45) Date of Patent: Jun. 3, 2025

(54) METHODS AND APPARATUS FOR CONTROLLING UPLINK REFERENCE SIGNAL TRANSMISSIONS IN A WIRELESS COMMUNICATION NETWORK

(71) Applicant: Telefonaktiebolaget LM Ericsson (publ), Stockholm (SE)

(72) Inventors: Ritesh Shreevastav, Upplands Väsby (SE); Florent Munier, Västra Frölunda (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/610,620

(22) PCT Filed: May 13, 2020

(86) PCT No.: PCT/EP2020/063387
§ 371 (c)(1),
(2) Date: Nov. 11, 2021

(87) PCT Pub. No.: WO2020/229567
PCT Pub. Date: Nov. 19, 2020

(65) Prior Publication Data
US 2022/0209927 A1    Jun. 30, 2022

Related U.S. Application Data

(60) Provisional application No. 62/847,521, filed on May 14, 2019.

(51) Int. Cl.
*H04L 5/00*    (2006.01)
(52) U.S. Cl.
CPC .......... *H04L 5/0082* (2013.01); *H04L 5/0051* (2013.01); *H04L 5/0069* (2013.01); *H04L 5/0096* (2013.01)

(58) Field of Classification Search
CPC ... H04L 5/0082; H04L 5/0051; H04L 5/0069; H04L 5/0096
See application file for complete search history.

(56) References Cited

U.S. PATENT DOCUMENTS

2014/0036809 A1    2/2014    Xu et al.
2017/0288897 A1   10/2017    You et al.
(Continued)

FOREIGN PATENT DOCUMENTS

CO    15162406    9/2017

OTHER PUBLICATIONS

"DL and UL Reference Signals for NR Positioning", 3GPP TSG RAN WG1 96, R1-1905461, Ericsson, Xi'an, P.R. China, Apr. 8-12, 2019, 14 pages.
(Continued)

*Primary Examiner* — Shukri Taha
(74) *Attorney, Agent, or Firm* — Murphy, Bilak & Homiller, PLLC

(57) ABSTRACT

In an example arrangement, a base station (16) serving a wireless device (14) controls the activation time for transmission by the wireless device (14) of aperiodic or semi-persistent Sounding Reference Signals (SRS), but accounts for an activation-time recommendation made by a location server (20) with which the serving base station (16) provides its timing information. The arrangement allows the location server (20), which has a view of the overall timeline, to recommend an activation time while still leaving the serving base station (16) in control of the activation time, which the serving base station (16) shares with the location server (20). In turn, the location server (20) uses the activation time to configure neighboring base stations (16), for example, for coordinated reception of the SRS, for positioning the device (14) via Uplink Observed Time Difference of Arrival (UT- (Continued)

DOA) determinations. Activation of the SRS provides, for example, increased SRS density as compared to any ongoing periodic SRS transmissions performed by the wireless device (14).

10 Claims, 15 Drawing Sheets

(56) References Cited

U.S. PATENT DOCUMENTS

| | | | | |
|---|---|---|---|---|
| 2018/0076940 | A1* | 3/2018 | Zhou | H04B 7/0413 |
| 2019/0190669 | A1* | 6/2019 | Park | H04W 56/001 |
| 2021/0058209 | A1* | 2/2021 | Qin | H04L 5/0023 |
| 2021/0344399 | A1* | 11/2021 | Levy | H04L 5/0053 |
| 2023/0040353 | A1* | 2/2023 | He | H04L 5/001 |

OTHER PUBLICATIONS

"SRS Update Support in NBPS for LTE", 3GPP TSG-RAN2 Meeting #77bis, R2-121127, TruePosition, Jeju, Korea, Mar. 26-30, 2012, 8 pages.

"RAT-dependent UL-only NR positioning techniques", 3GPP TSG RAN WG1 #96, R1-1903019, Qualcomm Incorporated, Athens, Greece, Feb. 25-Mar. 1, 2019, 6 pages.

"SRS design for NR Positioning", 3GPP TSG RAN WG1 Meeting #97, R1-1906053, Huawei, HiSilicon, Reno, USA, May 13-17, 2019, 9 pages.

"SRS Enhancements for NR positioning", 3GPP TSG RAN WG1 Meeting #96b, R1-1905484, Fraunhofer IIS, Fraunhofer HHI, Xi'an, China, Apr. 8-12, 2019, 12 pages.

"UL Reference Signals for NR Positioning", 3GPP TSG RAN WG1 Meeting #97, R1-1907509, Ericsson, Reno, NV, USA, May 13-17, 2019, 7 pages.

* cited by examiner

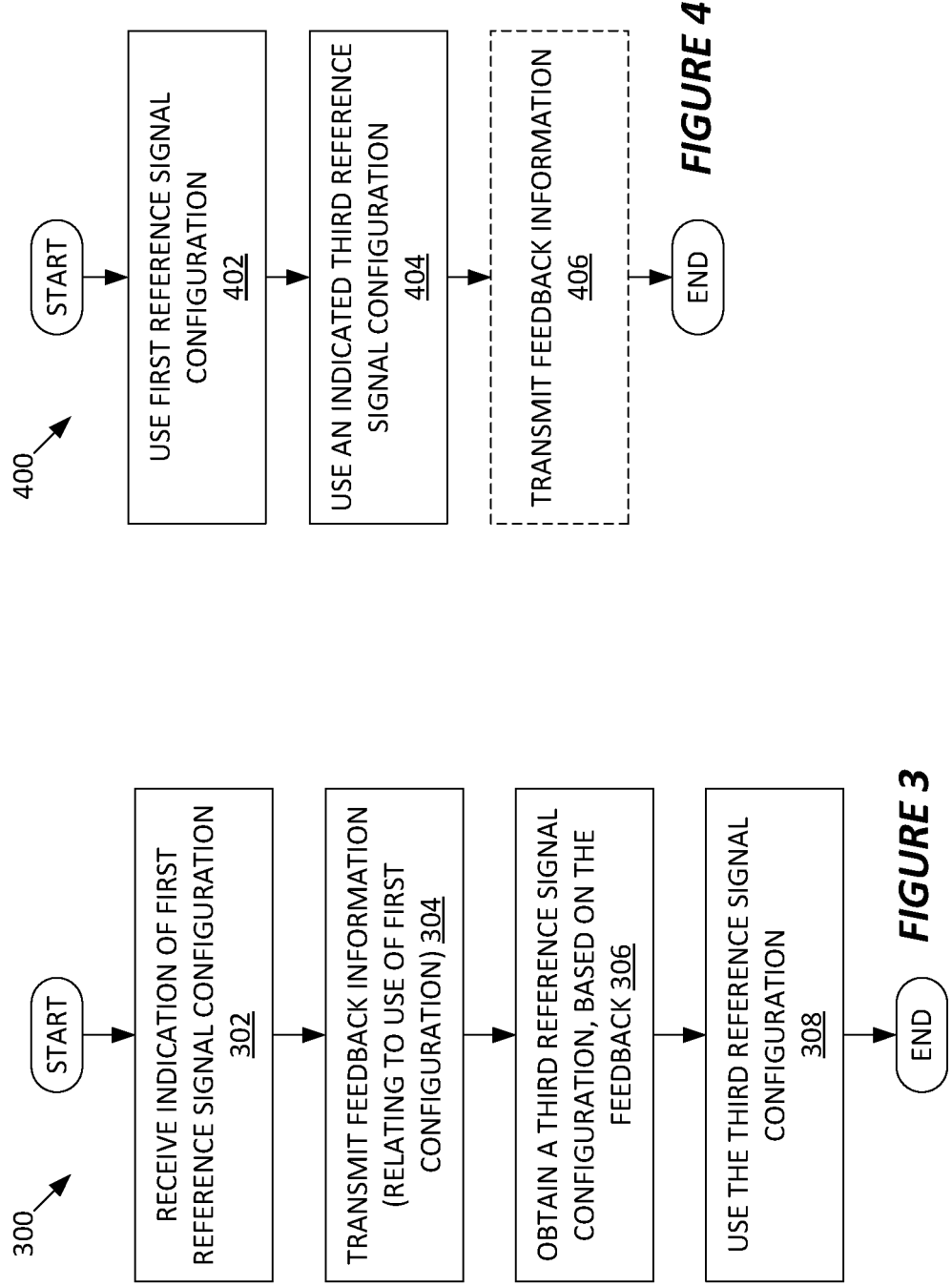

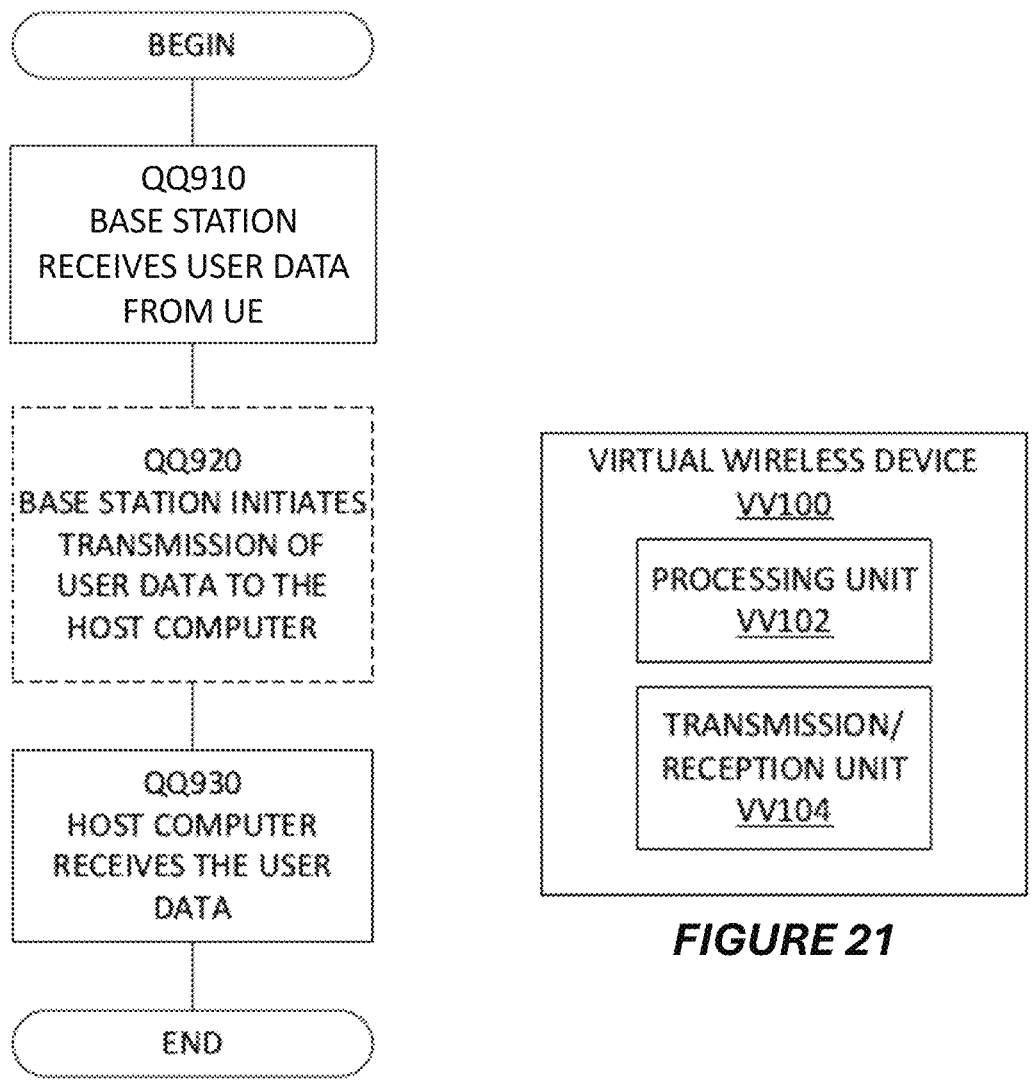
FIGURE 20
FIGURE 21
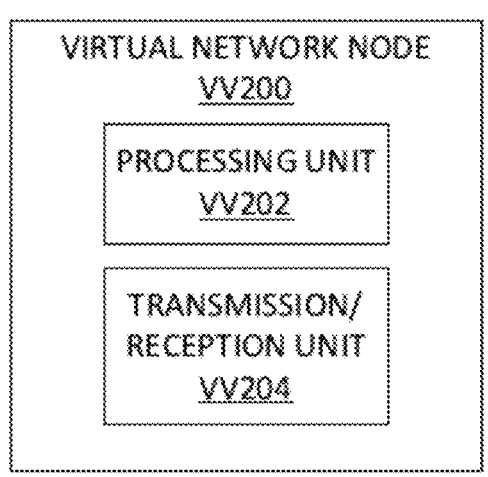
FIGURE 22

METHODS AND APPARATUS FOR CONTROLLING UPLINK REFERENCE SIGNAL TRANSMISSIONS IN A WIRELESS COMMUNICATION NETWORK

TECHNICAL FIELD

The present invention relates to controlling the transmission of uplink reference signals by a wireless device, for positioning of the wireless device.

BACKGROUND

Positioning has been a topic in Long Term Evolution (LTE) standardization since 3GPP Release 9, where "3GPP" denotes the Third Generation Partnership Project. The primary objective is to fulfill regulatory requirements for emergency call positioning. Legacy LTE standards for positioning support the following techniques:

- enhanced cell ID (E-Cell-ID), where the cell ID of the serving cell of a wireless device, along with additional information, provide a mechanism for determining the location of the wireless device, which is referred to as "positioning" the device;
- assisted Global Navigation Satellite System (GNSS), where the network provides GNSS assistance information to the wireless device, to facilitate GNSS measurements by the device for positioning;
- OTDOA (Observed Time Difference of Arrival) positioning, where the device estimates the time difference of reference signals from different base stations and returns the estimates to the network, for positioning the device via multilateration;
- UTDOA (Uplink TDOA) positioning, where the device is requested to transmit a specific waveform that is detected by multiple location measurement units at known locations, such as network base stations, and where the corresponding measurements are then forwarded to a positioning node (e.g., an Evolved Serving Mobile Location Center or E-SMLC) for positioning the device via multilateration.

In the above examples and more generally herein, the term "wireless device" denotes a User Equipment (UE) or other communication apparatus that is configured to use a wireless communication network, e.g., as an access network, for engaging in one or more types of communication services provided by or through the network.

For the New Radio (NR) positioning for Rel.16 (Fifth Generation or 5G standardization), the 3GPP NR radiotechnology is positioned to provide added value in terms of enhanced location capabilities. The operation in low and high frequency bands, (i.e. below and above 6 GHz) and utilization of massive antenna arrays, provides additional degrees of freedom to substantially improve the positioning accuracy. The possibility to use wide signal bandwidth in low and especially in high bands brings new performance bounds for user location for well-known positioning techniques based on OTDOA and Uplink Observed Time Difference of Arrival (UTDOA), Cell-ID or E-Cell-ID etc., utilizing timing measurements to locate the wireless device. The recent advances in massive antenna systems (massive Multiple-Input-Multiple-Output or MIMO) can provide additional degrees of freedom to enable more accurate user location by exploiting spatial and angular domains of propagation channel in combination with time measurements.

3GPP Release 9 introduced Positioning Reference Signals (PRS) for antenna port 6 for OTDOA, because the Release 8 cell-specific reference signals were not sufficient for OTDOA positioning. The simple reason is that the required high probability of detection could not be guaranteed. A neighbor cell with its synchronization signals (Primary-/Secondary Synchronization Signals) and reference signals is seen as detectable when the Signal-to-Interference-and-Noise Ratio (SINR) is at least −6 dB. Simulations during standardization demonstrated that this condition can be guaranteed for only 70% of all cases for the third best-detected cell, which means the second-best neighboring cell of the serving cell. That number is not enough and it further assumes an interference-free environment, which cannot be ensured in a real-world scenario. However, PRS have certain similarities to Release 8 cell-specific reference signals. For example, PRS involve pseudo-random Quadrature Phase Shift Keying (QPSK) sequences that are mapped in diagonal patterns, with shifts in frequency and time to avoid collision with cell-specific reference signals and an overlap with the control channels, such as the Physical Downlink Control Channel (PDCCH).

In NR, the PRS design is not yet finalized. Likely candidates are Tracking Reference Signals (TRS), Extended-TRS and LTE alike PRS, etc. In this document, the term "Positioning Reference Signal" or "PRS" denotes any of the NR reference signals or new reference signals used for positioning.

The Sounding Reference Signal (SRS) is an uplink (UL) reference signal transmitted by a wireless device, and supports Channel State Information (CSI) measurements by the receiving radio network node(s) of the involved wireless communication network, such as for scheduling and link adaptation purposes. For NR, it is expected that the SRS will also be utilized for reciprocity-based precoder design for massive MIMO and UL beam management. It is likely that the SRS will have a modular and flexible design to support different procedures and wireless-device capabilities. SRS has been selected for the UTDOA positioning method in NR.

SUMMARY

In an example arrangement, a base station serving a wireless device controls the activation time for transmission by the wireless device of aperiodic or semipersistent Sounding Reference Signals (SRS), but can account for an activation-time recommendation made by a location server with which the serving base station provides its timing information. The arrangement allows the location server, which has a view of the overall timeline, to recommend an activation time while still leaving the serving base station in control of the activation time, which the serving base station shares with the location server. In turn, the location server uses the activation time to configure neighboring base stations, for example, for coordinated reception of the SRS, for positioning the device via Uplink Observed Time Difference of Arrival (UTDOA) determinations. Activation of the SRS provides, for example, increased SRS density as compared to any ongoing periodic SRS transmissions performed by the device.

One embodiment comprises a method of operation by a location server that is configured for operation in association with a wireless communication network. The method might include determining a need to activate an aperiodic or semipersistent Sounding Reference Signal (SRS) configuration of a wireless device, for positioning of the wireless device (e.g. via Uplink Observed Time Difference of Arrival (UTDOA) measurements made by a plurality of base stations in the wireless communication network). Further, the method can include determining a timing recommendation for a serving one of the base stations, the timing recommendation being an activation-time recommendation for the wireless device to activate the aperiodic or semipersistent SRS configuration. Still further, the method includes sending the timing recommendation to the serving base station, as a request to the serving base station to trigger the aperiodic or semipersistent SRS configuration by the wireless device.

In another embodiment, a location server is configured for operation in association with a wireless communication network and includes communication circuitry and processing circuitry. The communication circuitry is configured to communicatively couple the location server to one or more nodes of the wireless communication network and the processing circuitry is operatively associated with the communication circuitry. The processing circuitry might be configured to determine a need to activate an aperiodic or semipersistent SRS configuration by a wireless device, e.g. for positioning of the wireless device via UTDOA measurements made by a plurality of base stations in the wireless communication network. Further, the processing circuitry might be configured to determine a timing recommendation for a serving one of the base stations, the timing recommendation being an activation-time recommendation for the serving base station to activate the aperiodic or semipersistent SRS transmissions. Still further, the processing circuitry is configured to send the timing recommendation to the serving base station, as a request to the serving base station to trigger the aperiodic or semipersistent SRS configuration by the wireless device.

Another embodiment comprises a method of operation by a first base station configured for operation in association with a wireless communication network. The method includes receiving a timing recommendation from a location server, for a wireless device for which the first base station operates as a serving base station. The timing recommendation is an activation-time recommendation for activating an aperiodic or semipersistent SRS configuration by the wireless device, e.g. for positioning of the wireless device via UTDOA measurements made by a plurality of base stations, including the first base station. The method may further include determining an activation time for the aperiodic or semipersistent SRS configuration, in consideration of the timing recommendation, and sending an indication of the activation time to the location server. The method comprises sending an indication of the aperiodic or semipersistent SRS configuration to the wireless device for activating the configuration at the activation time.

A further embodiment comprises a base station that is configured for operation in association with a wireless communication network. Referring to the base station as a first base station, it includes first communication circuitry that is configured for communicatively coupling the first base station to one or more wireless devices, and for communicatively coupling the first base station to a location server. The first base station further includes processing circuitry that is operatively associated with the first and second communication circuitry and configured to receive a timing recommendation from a location server, for a wireless device for which the first base station operates as a serving base station. The timing recommendation is an activation-time recommendation for activating an aperiodic or semipersistent SRS configuration by the wireless device, e.g. for positioning of the wireless device via UTDOA measurements made by a plurality of base stations, including the first base station. The processing circuitry of the first base station might be further configured to determine an activation time for the aperiodic or semipersistent SRS configuration, in consideration of the timing recommendation, and send an indication of the activation time to the location server. The processing circuitry is further configured to send an indication of the aperiodic or semipersistent SRS configuration to the wireless device, for activating the configuration at the activation time.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 2 and 3 are logic flow diagrams of example embodiments of a method of operation by a location server of a wireless communication network.

FIG. 4 is a logic flow diagram of one embodiment of a method of operation by a radio network node or wireless device, operating in a wireless communication network.

FIG. 20 is a flowchart illustrating a method implemented in a communication system, in accordance with one embodiment.

FIGS. 21 and 22 are block diagrams of virtual apparatus according to some embodiments.

DETAILED DESCRIPTION

Figure 1:
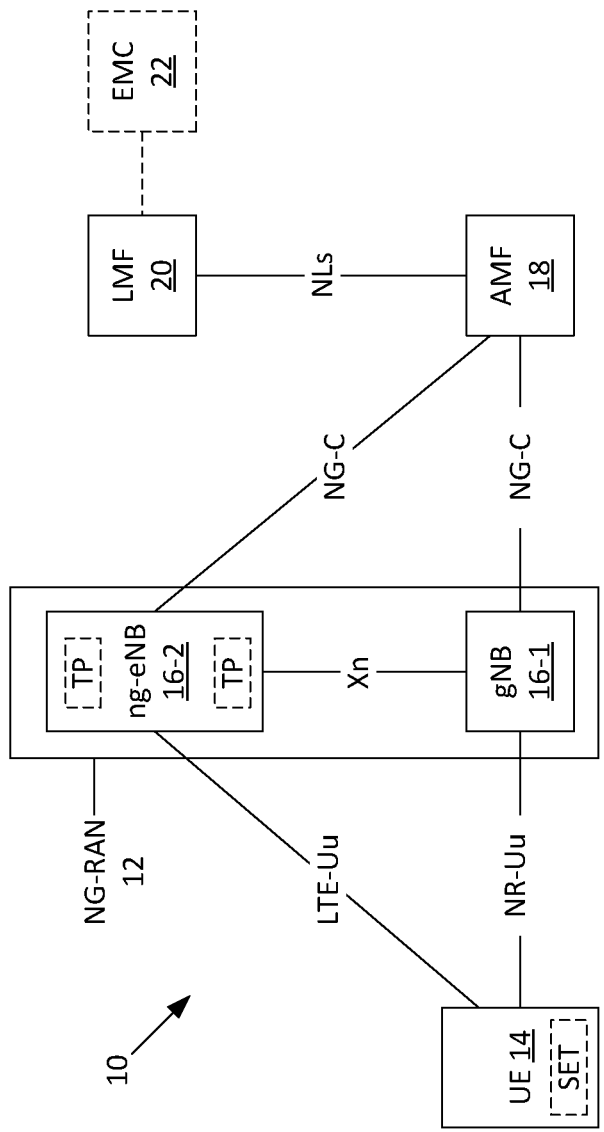
FIG. 1 is a block diagram of one embodiment of a wireless communication network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Herein, the term "Positioning Reference Signals" (PRS) is used as a general term for signals/channels transmitted by radio network nodes and received by the wireless device for positioning purposes. Examples of PRS are: dedicated PRS, Channel State Information Reference Signals (CSI-RS), Tracking Reference Signal (TRS), enhanced TRS, etc.

Herein, the term "Sounding Reference Signals" (SRS) is used as a general term for signals/channels transmitted by a wireless device and received by one or more radio network nodes for positioning purposes. Examples of SRS are: New Radio (NR) SRS, Uplink (UL) PRS.

Herein, the term "positioning measurement" may comprise wireless device or radio network node measurements based on PRS and/or SRS to be used for positioning purposes. Examples of positioning measurements comprise received signal power based on PRS and/or SRS, received signal quality (e.g., similar to Reference Signal Received Quality (RSRQ) or Signal to Interference plus Noise Ratio (SINR)), a timing measurement, Round Trip Time (RTT), Rx-Tx, Time of Arrival (ToA), Time Difference of Arrival (TDOA), etc.

Various examples presented in this document use the NR context for simplicity, but the solutions are applicable to other contexts, such as any NR deployment in general (e.g., standalone NR, New Radio Dual Connectivity (NR-DC) or NR-NR dual connectivity, E-UTRAN New Radio Dual Connectivity (EN-DC or E-UTRAN-NR dual connectivity, NE-DC or NR-E-UTRAN dual connectivity) or other Radio Access Technologies (RATs) including LTE.

The term "Location server" herein refers to a node with location/positioning functionality. The functionality may be comprised in various node types, such as in a base station or other radio network node, or in a core network node. Example positioning nodes include a "Location Management Function" (LMF) or an Evolved Serving Mobile Location Centre (E-SMLC). The term "location server" encompasses both examples and more broadly refers to any entity within a wireless communication network that includes positioning-determination functionality.

It has been appreciated that existing approaches to positioning raise certain challenges with respect to NR and beyond. For example, LTE relies on static PRS configurations that cannot be tuned for specific environment needs, cannot be made user specific, and cannot be made beam-specific within a cell.

Moving forward to NR, it may be beneficial to consider different radio propagation characteristics and wireless device movement, for efficient PRS configuration. When PRS is transmitted through beams, a more dynamic approach may be beneficial. By selecting the optimum number of beams for PRS transmission and by switching off the PRS transmission or configuring PRS density in a more opportunistic way, it is possible to be energy efficient. Further, it should be possible to optimize PRS resource in terms of number of consecutive PRS subframes, PRS bandwidth, PRS periodicity, PRS muting pattern, PRS offset, PRS Resource Elements (RE) density per Physical Resource Block (PRB), number of PRS ports, etc., adaptively to beams and UEs.

In some scenarios, it may be required that the update takes place instantaneously or otherwise on demand, for example, when a wireless device needs to accumulate more energy for TOA estimation. That is, positioning may require a denser PRS configuration, as compared to the density provided by the current PRS configuration of the device; thus, the number of consecutive subframes may have to be increased and/or the PRS periodicity can be made more frequent.

In another scenario, a wireless device may have difficulty in performing PRS measurements as the PRS Bandwidth (BW) could be outside the wireless device BW part (BWP) or the configured active BW part. In such cases, beamformed PRS for the wireless device is required to be transmitted within the wireless device BWP. Thus, an immediate switching or mechanism to trigger such switch is needed.

The location server (LS) has a good view on the overall PRS utilization and is thus best positioned to prepare a new PRS configuration for a wireless device and initiate the switch of PRS configurations or, alternatively, it may recommend a certain configuration to one or more radio network nodes. But approaches known to date do not provide for the contemplated location-server based triggering and recommendations to radio network nodes. Similarly, for UL SRS, a trigger may be provided to reconfigure UL SRS configuration. Certain aspects of the present disclosure and their embodiments may provide solutions to these or other challenges.

Embodiments described herein provide methods and apparatus to dynamically or semi-dynamically (semi-persistently) trigger the update of a reference signal configuration (e.g., Positioning Reference Signal (PRS) or Sounding Reference Signal (SRS) configuration) for use in determining a positioning measurement.

There are, proposed herein, various embodiments which address one or more of the issues disclosed herein. Certain embodiments may provide one or more of the following technical advantage(s): enabling Dynamic PRS/SRS configuration, providing better utilization of resources; and providing support for flexible beam-based positioning. As a key advantage, dynamically configuring potentially large amounts of PRS for specific wireless device(s) at positioning occasions avoids the waste that might otherwise result from statically assigning such resources.

FIG. 1 illustrates an example wireless communication network 10 in which one or more nodes or entities carry out respective positioning-related operations as described herein. Again, while the network 10 has example details from the NR context, this disclosure is not limited to the specific examples given. The network 10 includes a Next Generation (NG) Radio Access Network (RAN) 12 with a number of radio network nodes, also referred to as access nodes, base stations, Transmission/Reception Points (TRPs), or the like. The NG-RAN 12 provides radio connectivity with wireless devices, with the diagram showing one wireless device 14, labeled in the diagram as a "UE".

By way of example, the NG-RAN 12 includes two radio network nodes 16-1 and 16-2, although it may contain a fewer or greater number of radio network nodes 16. The radio network nodes 16 may be respective single nodes or may be distributed systems, such as one or more digital units coupled to remote radio units. For discussion purposes, the radio network node 16-1 is a 5G base station, referred to as an gNB, and the radio network node 16-2 is a 4G (LTE) base station configured for operation with a 5G core network, referred to as an ng-eNB. The gNB and ng-eNB may not always both be present. When both the gNB and ng-eNB are present, the NG-C interface is present for one of them only.

The core-network portion of the network 10 includes one or more Access and Mobility Functions (AMFs) 18, for controlling access and mobility of the wireless devices 14 through and in the respective service areas (coverage areas) of the radio network nodes 16. Further, the core-network portion of the network 10 includes a positioning node, shown as a Location Management Function (LMF) 20, that is operative to perform positioning calculations based on measurements provided by the radio network nodes 16 and/or wireless devices 14 targeted for positioning. For generality, the LMF 20 is referred to as a "location server" 20, and it may be associated with or implemented as an EMC 22.

Figure 2:
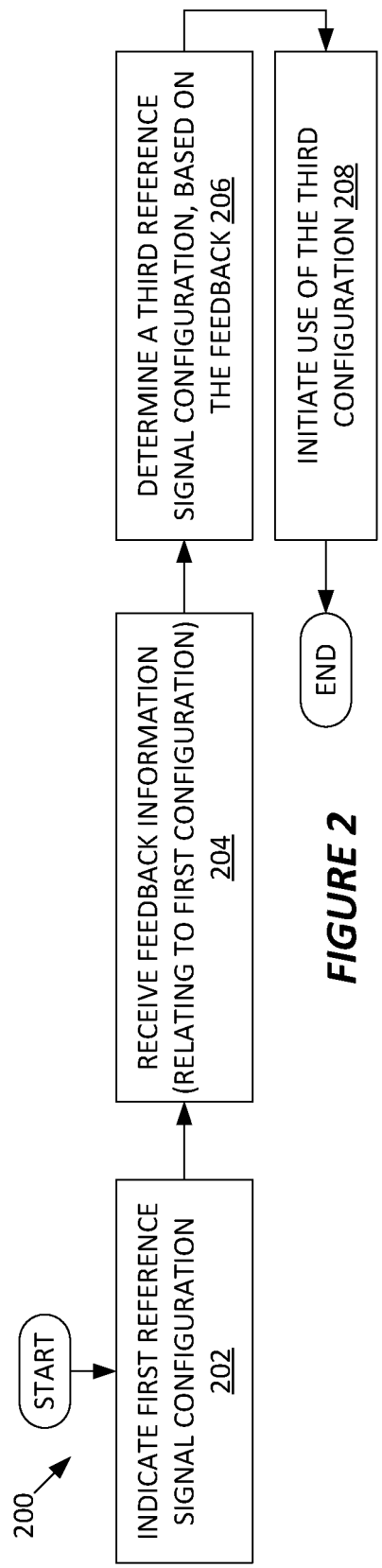

As an example embodiment, FIG. 2 illustrates a method 200, as performed by a location server of a wireless communication network, e.g. LMF 20. The method 200 includes indicating (Block 202) a first reference signal configuration to a radio network node or a wireless device. The method 200 further includes receiving (Block 204) feedback information from the radio network node or the wireless device and determining (Block 206) a third reference signal configuration based on the feedback information.

The feedback comprises, for example a second reference signal configuration, as determined by the radio network node or the wireless device as a preferred configuration. In such cases, the location server may adopt the second reference signal configuration as the third configuration, or the location server may adapt the first reference signal configuration in view of the second reference signal configuration. As another example, the feedback information comprises performance or measurement information that is dependent on use of the first reference signal configuration and the location server adapts the first reference signal configuration in consideration of the feedback. As another example, the feedback information comprises one or more updated values of the first reference signal configuration, as determined by the radio network node or the wireless device, and the location server adapts the first reference signal configuration in consideration of the feedback.

The method 200 further includes initiating (Block 208) use of the third reference signal configuration. For example, if the configuration in question is a configuration for use by the radio network node in transmitting one or more DL reference signals, the location server initiates use of the reference signal configuration by the radio network node. If the configuration in question is a configuration for use by the wireless device in transmitting one or more UL reference signals, the location server initiates use of the reference signal configuration by the wireless device.

In more detail, the location server may trigger positioning measurements and/or wireless device location estimation, based on the third reference signal configuration. For example, the third reference signal configuration may be provided to the entity that will perform measurements in support of the positioning calculations (e.g., wireless device or the radio network node and/or other radio network nodes, Location Measurement Units (LMUs), etc.). The information may be included in assistance data, which may trigger corresponding measurements and/or wireless device location estimation. In cases where the third reference signal configuration is a configuration for use by the wireless device, the information may be conveyed to the wireless device via the radio network node.

The first reference signal configuration may be a default or pre-configured configuration. The feedback information may originate from the radio network node or the wireless device. It will be appreciated that feedback information may be provided by the wireless device or radio network node relating to whatever reference signal configuration is currently in use by the radio network node or wireless device. In this example, the current reference signal configuration is the first reference signal configuration.

The feedback information may comprise any one or more of: Positioning Reference signal (PRS) measurements based on the first reference signal configuration; feedback on received PRS signal quality or quality of PRS-based measurements based on the first reference signal configuration; Sounding Reference Signal (SRS) measurements based on the first reference signal configuration; feedback on received SRS signal quality or quality of SRS-based measurements based on the first reference signal configuration; a desired value for one or more parameters of the third reference signal configuration; an indication that one or more parameters of the first reference signal configuration needs updating ((e.g., a request for a sparser or denser reference signal configuration, indication that the configured PRS and/or SRS are no longer needed, indication of beams or directions where PRS and/or SRS are needed, etc.); an indication of a beam or Synchronization Signal Block (SSB) quality; an indication of N, where N is an integer, best beams for each of one or more cells; an indication that PRS should be configured for a particular wireless device (e.g., in certain locations or directions, bandwidth parts, etc.); and an indication that PRS is not needed for a particular wireless device (e.g., in certain cells, locations or directions, bandwidth parts, etc.).

The feedback information may also comprise an indication of a second reference signal configuration. The indication of the second reference signal configuration may only indicate the parameters that differ from the first reference signal configuration or may indicate the entire second reference signal configuration. In other words, the second reference signal configuration may comprise all or a subset of parameters, e.g., when only some parameters are different from the first configuration; this may also be a preferred reference signal configuration for the wireless device or radio network node transmitting the feedback information.

In determining the third reference signal configuration based on the feedback information, the location server may analyze the feedback information to determine whether the first reference signal configuration is sufficient. If so, the location server may set the third reference signal configuration as the first reference signal configuration. If not, the location server may update the first reference signal configuration based on the feedback information, to generate the third reference signal configuration. And, as noted above, the feedback information may comprise a second reference signal configuration determined by the radio network node or the wireless device, as an update to the first reference signal configuration. In such cases, the location server node may set the third reference signal configuration as the second reference signal configuration.

In initiating use of the third reference signal configuration by the radio network node or the wireless device, the location server may transmit an indication or message to the radio network node or wireless device, to initiate use of the third reference signal configuration. The indication or message may comprise information as to when the switch to the third reference signal configuration should be made as described below. For example, assistance data may be transmitted to a measuring node (for example the radio network node or wireless device) or a triggering message may comprise, e.g., a complete set of parameters for the third reference signal configuration, a subset of changed or new parameters for the third reference signal configuration as compared to the first reference signal configuration, or an identification of a pre-defined configuration for the third reference signal configuration.

The initiating step may be performed responsive to determining that a new third configuration is needed. The result may be transmitting PRS via an updated set of beams, updated PRS and/or SRS density, updated transmit (TX) power of PRS and/or SRS, power boosting or de-boosting, configuring PRS and/or SRS in at least some resources where they were not configured before, de-configuring (e.g., stop transmitting) PRS and/or SRS in at least some resources where they were transmitted before, updating any one or more configuration parameters for SRS and/or PRS, etc.

FIG. 3 illustrates an example method 300 performed by a radio network node (e.g. gNB 16-1) for updating a reference signal configuration for use in determining a positioning measurement, where the method steps may be repeated.

According to the method 300, the radio network node receives an indication of a first reference signal configuration from a location sever (Block 302). The radio network node transmits feedback information to the location server relating to use of the first reference signal configuration (Block 304), obtains a third reference signal configuration that is based on the feedback (Block 306), and uses the third reference signal configuration (Block 308).

The feedback information, for example, comprises measurements made by the radio network node and/or the wireless device with respect to use of the first reference signal configuration, or comprises recommended updates to one or more parameters of the first reference signal configuration, or comprises a third reference signal configuration to be used in place of the first reference signal configuration. Thus, the step of obtaining the third reference signal configuration varies in dependence on the nature of the feedback and in dependence on whether the reference signal configurations in question are configurations for downlink reference-signal transmission by the radio network node or configurations for uplink reference-signal transmissions by the wireless device.

In one example of obtaining the third reference signal configuration, the location server indicates to the radio network node that PRS need to be available/configured for one or more wireless devices (e.g., in certain cells, locations or directions, bandwidth parts, etc.), and/or receiving an indication that PRS are not needed any more for one or more wireless devices (e.g., in certain cells, locations or directions, bandwidth parts, etc.).

As for "using" the third reference signal configuration, in an example where the configuration targets the wireless device, the radio network node may use assistance data or a Medium Access Control Element (MAC CE) or a Downlink Control Information (DCI) based trigger, to update the PRS or SRS parameters of the wireless device. A configuring radio network node may trigger the wireless device to use (e.g., receive or transmit) the (updated) third reference signal configuration. The third reference signal configuration may also mean in some examples that the wireless device should stop using at least some PRS and/or should stop transmitting some SRS.

More generally, the radio network node "using" the third reference signal configuration may comprise one or more of: triggering the wireless device to use the third reference signal configuration; transmitting PRS according to the third reference signal configuration; receiving SRS from the wireless device according to the third reference signal configuration; performing a positioning measurement according to the third reference signal configuration; configuring the wireless device to perform a positioning measurement according to the third reference signal configuration; reporting to the location sever or another radio network node a positioning measurement based on the third reference signal configuration; and transmitting an indication of the third reference signal configuration to another radio network node. In other examples, the radio network node transmits PRS based on the third reference signal configuration, stops transmitting PRS in at least some resources, or starts transmitting PRS in at least some resources (e.g., if the UE no longer needs them).

FIG. 4 depicts another example embodiment; namely, a method 400 performed by a wireless device (e.g. UE 14) for updating a reference signal configuration for use in determining a positioning measurement. The wireless device utilizes a first reference signal configuration (Block 402). The wireless device may provide feedback relating to the first reference signal configuration before Block 404. The feedback information may be used by the location server and/or the involved radio network node in determining a third reference signal configuration.

Then, responsive to receiving an indication of a third reference signal configuration from a radio network node or a location server, the wireless device utilizes the third reference signal configuration (Block 404). The third reference signal configuration may be the same as the first configuration or may be an update or replacement for the first reference signal configuration.

The wireless device utilizing the third reference signal configuration comprises one or more of: receiving PRS according to the third reference signal configuration; transmitting SRS according to the third reference signal configuration; and performing a positioning measurement involving SRS according to the third reference signal configuration (e.g., Transmit (Tx)-Receive (Rx) measurements by the wireless device).

The wireless device may determine the third reference signal configuration from the indication of the third reference signal configuration. Determining may be based on the message from radio network node or location server or may be triggered by the trigger from location server and/or radio network node (e.g., MAC CE or DCI) upon which the wireless device is triggered to determine the third reference signal configuration and/or upon which the wireless device is triggered to start using the third reference signal configuration.

In some embodiments, the method 400 includes the wireless device transmitting (Block 406) feedback information to the location server and/or the radio network node. This feedback information may relate to the third reference signal configuration. The method may repeat but with the third reference signal configuration now being the current (first) reference signal configuration and with feedback being based on use of the third reference signal configuration as the new first reference signal configuration. In other words, the method 400 can be understood as a mechanism whereby the wireless device uses a given reference signal configuration, provides feedback on the given reference signal configuration, and then receives an indication of any changes to the given reference signal configuration, and operates according to any indicated changes.

The feedback information comprises one or more of: PRS measurements based on the first reference signal configuration; feedback on received PRS signal quality or quality of PRS-based measurements based on the first reference signal configuration; a desired value for a parameter of the third reference signal configuration; an indication that a parameter of the first reference signal configuration needs updating (e.g., a request for a sparser or denser signal configuration, indication that the configured PRS and/or SRS are no longer needed, indication of beams or associated SSBs or directions where PRS and/or SRS are needed, etc.); an indication of a beam or SSB quality; and an indication of N, where N is an integer, best beams for each of one or more cells.

The feedback information may also comprise an indication of a preferred reference signal configuration or signal availability (e.g., PRS and/or SRS density, periodicity, bandwidth part, consecutive subframes, number of ports, with or without hopping, with or without carrier/port/beam switching, preferred beams or SSBs quasi-located or associated with PRS and/or SRS).

The feedback information may also comprise an indication that some PRS and/or SRS are not needed any longer, e.g., because the positioning measurements have been completed. The indication of a reference signal configuration may comprise a full reference signal configuration or it can be delta-configuration, e.g., only comprise changed or new parameters.

As for an example UL reference signal configuration, an UL signal/channel related reference signal configuration may comprise one or more of:

- trigger to start or stop using a configuration, e.g., stop using the previous configuration or start using a configuration with a certain pre-defined index;
- information about the wireless device antenna port(s) used to transmit the UL signal (e.g., number of ports, port index, etc.);
- wireless device Tx port switching information (e.g., an indication of whether it is used or not, the number of ports participating in the switching, switching time, switching order of ports or switching pattern, etc.);
- UL carrier-based switching for signals/channels to be used for positioning (e.g., indication of whether it is used or not, the carriers participating in the switching, switching order of carriers or switching pattern, carrier from which it is switching, carrier to which it is switching, switching time, etc.);
- wireless device Tx beam switching (e.g., indication of whether it is used or not, the number of beams participating in the switching or the number of Tx beam modes between which the switching occurs, switching time, switching order of beams or switching pattern, etc.);
- implicit or explicit information about the direction of the UL signal transmission and UE beamforming configuration (e.g., direction of the serving BS, direction in which the best beam on the carrier is received, beam width, beam index, etc.);
- channel properties (e.g., quasi co-location with a specific DL or UL channel/signal or its transmission point);
- UL signal transmit power or power control configuration parameter(s) for UL signals/channel to be used for positioning (e.g., the set of configurable parameters or values or setting rules may also be different for positioning than for data);
- carrier frequency (e.g., center frequency or the starting frequency for the carrier bandwidth);
- bandwidth;
- time-frequency resource allocation/scheduling;
- periodicity for periodic UL signal;
- offset with respect to a certain reference, e.g., with respect to the beginning of System Frame Number 0 (SFN0) or with respect to another signal/channel;
- UL signal muting (e.g., pattern or periodicity);
- Wireless device UL active bandwidth part;
- UL signal frequency hopping configuration;

an UL signal switching configuration may comprise one or more of:

- any of Cell/carrier/port/beam from which the switching is performed;
- one or more cells/carriers/port/beam to which the switching is performed;
- time, periodicity, or time resources when the switching is to be performed;
- number of switching occurrences or the total time during which the wireless device will be performing switching and transmitting UL signal for positioning or a condition/indication to stop performing switching and corresponding UL signal transmissions;
- interruption length which may be caused by a single switching (may depend on the frequency range such as Frequency Range 1 (FR1) or Frequency Range 2 (FR2), UL signal numerology such as subcarrier spacing, wireless device capability, number of carriers over which the switching is performed, subframe type or subframe configuration in which the switching or corresponding UL signal transmission is performed, UE architecture, etc.); and
- an implicit or explicit indication of whether the switching is within a frequency range (e.g., FR1 only or FR2 only) or across multiple frequency ranges (e.g., between FR1 and FR2, where FR1 and FR2 may be lower and higher frequency bands or ranges of operation).

As for DL reference signal configuration, the indication of the reference signal configuration may comprise a full reference signal configuration or it may comprise a delta-configuration, e.g., comprise only changed or new parameters. In any case, the reference signal configuration for a radio network node on the downlink may comprise one or more of:

- trigger to start or stop using a configuration, e.g., stop using the previous configuration or start using a configuration with a certain pre-defined index;
- a set of beams via which PRS is to be transmitted or a set of associated SSBs or a set of replicated copies/instances of PRS;
- there may also be an indication whether and which of PRS instances can be combined or not, e.g., if can be combined they are likely to be transmitted via the same beams, otherwise different copies of PRS may be transmitted in different directions/via different beams;
- information about the wireless device antenna port(s) used to receive the DL signal (e.g., number of Rx ports, etc.)
- wireless device Rx port switching/sweeping information (e.g., indication of whether it is used or not, the number of ports participating in the switching, switching time, switching order of ports or switching pattern, etc.);
- carrier-based switching for signals/channels to be used for positioning (e.g., indication of whether it is used or not, the carriers participating in the switching, switching order of carriers or switching pattern, carrier from which it is switching, carrier to which it is switching, switching time, etc.);
- radio network node Tx beam switching (e.g., indication of whether it is used or not, the number of beams participating in the switching or the number of Tx beam modes between which the switching occurs, switching time, switching order of beams or switching pattern, etc.);
- implicit or explicit information about the direction of the DL signal transmission or network beamforming configuration (e.g., direction of the serving base station (radio network node), direction in which the best beam on the carrier is received, best Synchronization Signal Block (SSB), beam width, beam index, etc.);

channel properties (e.g., quasi co-location with a specific DL or UL channel/signal or its transmission point);

transmit power or power control configuration parameter(s) for DL signals/channel to be used for positioning (e.g., the set of configurable parameters or values or setting rules may also be different for positioning than for data);

carrier frequency (e.g., center or the starting frequency);

bandwidth;

time-frequency resource allocation/scheduling;

periodicity for periodic DL signal;

offset with respect to a certain reference, e.g., with respect to the beginning of SFN0 or with respect to another signal/channel;

search window or estimated receive timing;

wireless device DL active bandwidth part;

DL signal frequency hopping configuration; and

DL signal beam hopping configuration.

As for positioning measurement requirements in the context of changing PRS and/or SRS configurations, positioning measurements may be required to meet one or more requirements when one or more reference signal configuration (e.g. PRS and/or SRS configuration) changes occur during the measurement period. Such measurements requirements may be based on the most pessimistic or sparse configuration, e.g., longest periodicity, smallest bandwidth, lowest signal density, etc. which were used during the measurement period. If the measurements in question are performed by the wireless device, the wireless device is to be tested and verified that it meets the corresponding requirements. If the measurement is performed by the radio network node, the network node is to be tested and verified that it meets the corresponding requirements.

Figure 5:
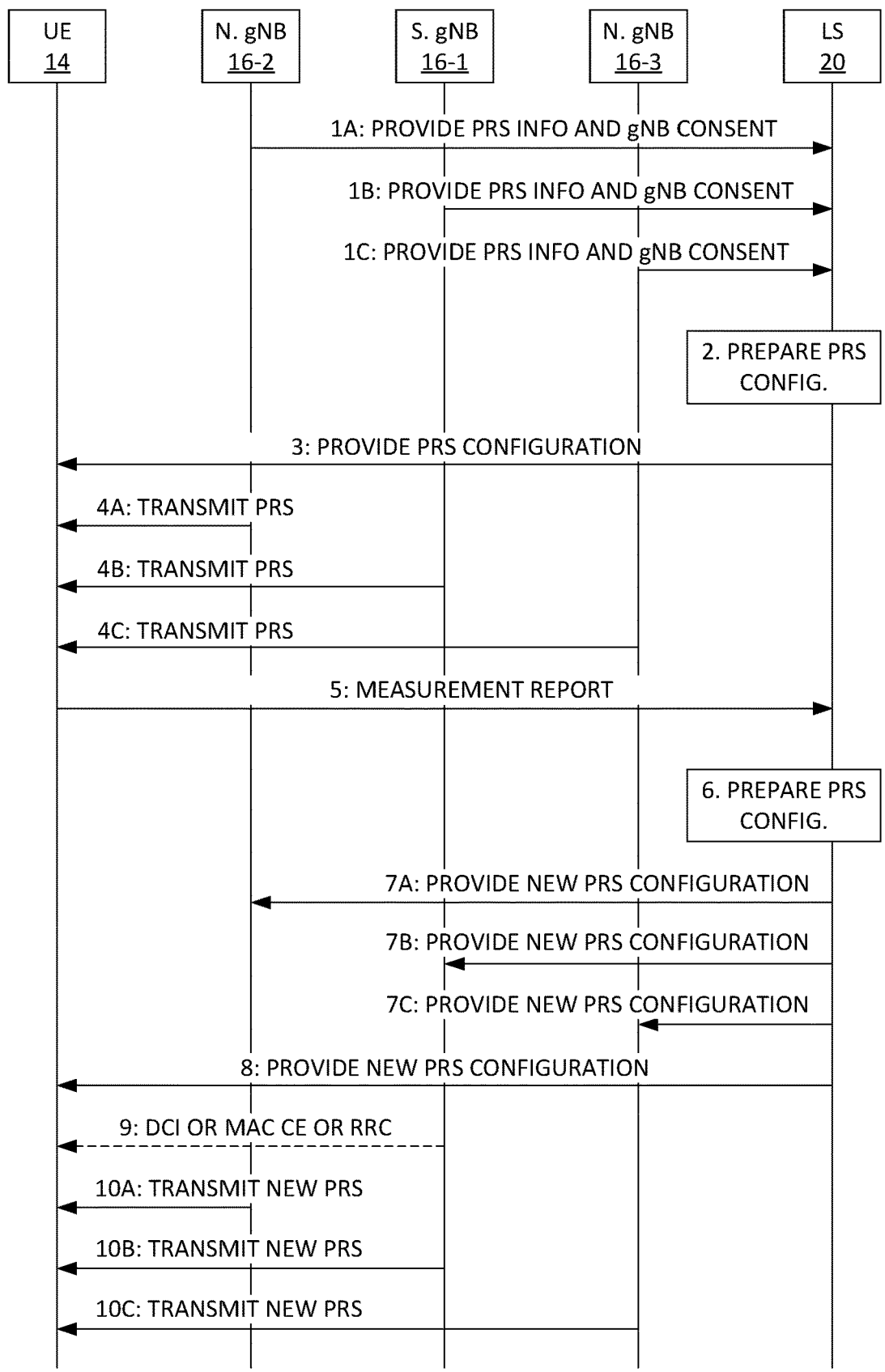
FIG. 5 is a signal flow diagram of one embodiment of inter-entity signaling according to one embodiment of dynamically reconfiguring reference signal transmissions for positioning of a wireless device.

FIG. 5 illustrates one example of dynamically adapting a DL PRS configuration. In some embodiments, the location server (LS) obtains the consensus/approval from the involved radio network node(s), e.g., gNBs 16-1, 16-2, 16-3, as to whether location server can reconfigure the PRS parameters or beams for PRS transmission (i.e., change the first reference signal configuration where the first reference signal configuration is a PRS configuration). In the diagram, "S. gNB" denotes a radio network node that is a serving node with respect to a wireless device targeted for positioning, while "N. gNB" denotes radio network nodes that neighbor the serving node.

For the case where serving gNB has provided consent, the location server (LS) performs the reconfiguration using an NR Positioning Protocol A (NRPPa) message and LTE Positioning Protocol (LPP). Over NRPPa, the LS sends the new PRS configuration that the gNB should use for transmitting DL PRS. Over LPP, the location server sends information indicating the new PRS configuration, so that the device knows how to monitor for the new or changed PRS transmissions. The location server also includes the time when the new update will take place. In other words, the location server transmits an indication of when the PRS changes take effect.

In some embodiments, the switch to using the new configuration may happen with respect to the PRS periodicity. Alternatively, the switching time may be configured with respect to a multiple of PRS periodicity. Considering PRS is transmitted every 100 ms, the switch would then coincide with the start of next PRS transmission occasion or a multiple of PRS periodicity (n*100 milliseconds).

In some embodiments, for aperiodic and semi persistent scheduling of PRS, a DCI trigger (aperiodic) or a DCI activation (semi persistent) is transmitted by the serving base station. The trigger could be based upon a MAC CE with a new Logical Channel Identifier (LCID). The PRS parameters that would be signaled to be reconfigured would be valid for multiple cells or for only certain cell(s), such as serving cell and the change can be specified for single instance or multiple instances.

In some embodiments, a Radio Resource Control (RRC) message (e.g. RRC Reconfiguration message) is used to reconfigure the PRS parameters. The RRC message is from serving cell and may contain the serving and/or neighbor PRS configuration parameters which need to be altered. The trigger for RRC Reconfiguration comes from NRPPa and the location server includes the timing information as to when the new configuration should take place.

Further, in some embodiments, to maintain the timeline of the activation/triggering, the location server informs the neighbor base station(s) of the instant when the new PRS configuration should be transmitted. For that purpose, the location server keeps track as to when to transmit the DCI trigger/activation in the serving base station and informs the neighbor base station(s) of the target subframe/slot offset where the PRS transmission will take place.

For example, in the context of FIG. 5, the location server sends an NRPPa message comprising the new PRS configuration to the serving base station, which can act as a trigger to the serving base station to send the DCI or MAC CE to the wireless device, based upon whether aperiodic or semi persistent configuration PRS is needed. The information would be provided by location server. The NRPPa message may contain the detailed time information as to when neighbor base stations should transmit the new configuration and when the serving base station is supposed to schedule the DCI or MAC CE. In the LPP message, the location server includes the information for the wireless device, as to when the wireless device should expect the new configuration to take place.

The example details are also valid for UL SRS, where the configuration would be provided by the network to the wireless device that is targeted for positioning, with the difference being that wireless device would transmit according to the new SRS configuration and one or more receiving base stations would perform the measurements.

In an example embodiment, the location server obtains the consensus/approval from the gNB or other involved radio network node as to whether the location server can reconfigure the SRS re-configuration of the wireless device. For the case where gNB provides consent, the location server performs the reconfiguration using NRPPa and LPP. Over NRPPa, the location server indicates the new SRS configuration to the radio network node(s), so that they may listen to the corresponding SRS transmissions by the wireless device. Over LPP, the location server sends the new SRS configuration to the wireless device, for configuring the wireless device to perform the corresponding SRS transmissions. The location server includes the time when the new update would take place. In some embodiments, the new configuration or switch may happen with respect to the SRS periodicity. Alternatively, the switching time is configured with respect to a multiple of the SRS periodicity. The switching time may also be a fixed time expressed in subframes or System Frame Number (SFN).

Therefore, for aperiodic and semi persistent scheduling of SRS, a DCI trigger (aperiodic) or a DCI/MAC-CE activation (semi persistent) is transmitted by the radio network node that provides the serving cell. To maintain the timeline of the activation/triggering, the location server may inform the neighbor cells of the instant when the SRS should be transmitted. To that purpose, the location server may be in control of when to transmit the DCI trigger/activation in the serving cell and inform the neighbor cell of the target subframe/slot offset where the PRS/SRS transmission/reception will take place.

Figure 6:
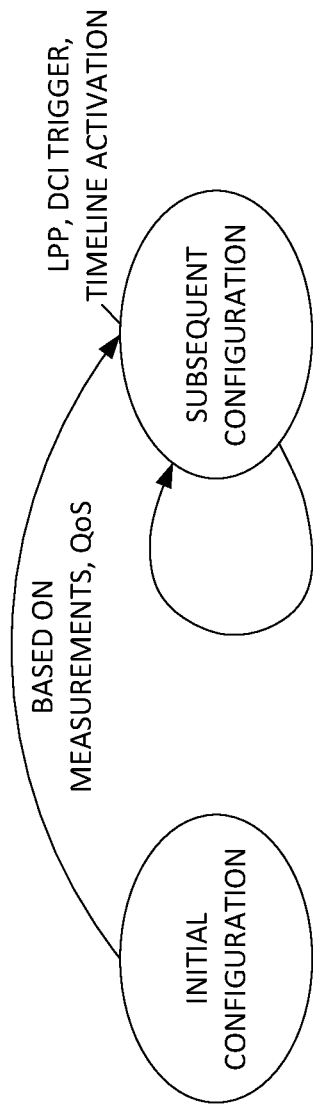
FIG. 6 is a diagram of example states and state transitions for a location server.

FIG. 6 illustrates example states and related state transitions for a location server, such as the location server 20 depicted in FIG. 1. In the diagram, the location server transitions from an initial-configuration state to a subsequent-configuration state, e.g., based on measurements or Quality-of-Service (QoS) considerations. For example, the initial configuration state corresponds to an initial or existing DL PRS configuration of a radio network node or an initial or existing UL SRS configuration of a wireless device, and the "measurements" in question are measurements made by the radio network node and/or wireless device with respect to the existing PRS/SRS configuration.

The location server transitions to the subsequent-configuration state responsive to determining from the measurements and/or requirements that the PRS or SRS configuration needs to change, e.g., to support a desired positioning operation or positioning quality with respect to a wireless device targeted for positioning. The location server triggers use of the subsequent configuration—e.g., a changed or updated configuration relative to the initial configuration—via LPP, DCI trigger, etc. The use may be time according to a timeline, e.g., where the location server is aware of the current configuration and the timing of the serving base station of the wireless device targeted for positioning.

Figure 7:
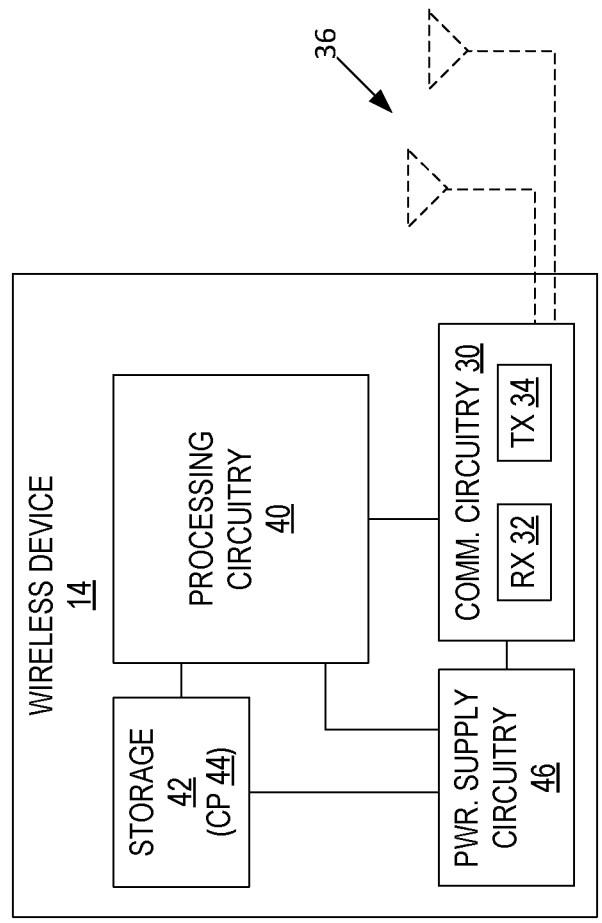
FIG. 7 is a block diagram of one embodiment of a wireless device.

FIG. 7 illustrates an example wireless device 14 according to one or more embodiments. The wireless device 14 includes communication circuitry 30, which is configured for transceiver operations and comprises receiver circuitry 32 and transmitter circuitry 34 and is associated with or coupled to one or more antennas 36. Further, the wireless device 14 includes processing circuitry 40 that is operatively associated with the communication circuitry 30. In at least one embodiment, the wireless device 14 includes storage 42, which may store one or more computer programs (CP) 44 that comprise computer program instructions for execution by one or more processors that may be included in or comprise the processing circuitry 40 to perform the methods described herein, for example the method described above with reference to FIG. 4. Still further, the wireless device 14 includes power supply circuitry 46.

The processing circuitry 40 comprises fixed circuitry or programmatically-configured circuitry or a mix of fixed and programmatically-configured circuitry. By way of example, the processing circuitry 40 comprises one or more types of digital processors that are specially adapted (configured) to carry out the device-side operations described herein, based on the execution of computer program instructions stored in the storage 42. To that end, the storage 42 in one or more embodiments comprises one or more types of computer-readable media. Examples include EEPROM, FLASH, Solid State Disk (SSD), SRAM/DRAM, etc. The storage 42 may comprise a mix of short-term (volatile) and longer-term (non-volatile) memory or storage devices, such as working RAM for program execution and nonvolatile memory for program storage.

The receiver circuitry 32 and transmitter circuitry 34 at least include radiofrequency receiver and transmitter circuitry configured for operation according to the air-interface requirements of one or more Radio Access Technologies (RATs) used by a wireless communication network, such as the wireless communication network 10 depicted in FIG. 1. Characterizing processing circuitry as being "operatively" associated with the communication circuitry means that the processing circuitry receives and/or transmits signaling (control or data) via the communication circuitry.

Figure 8:
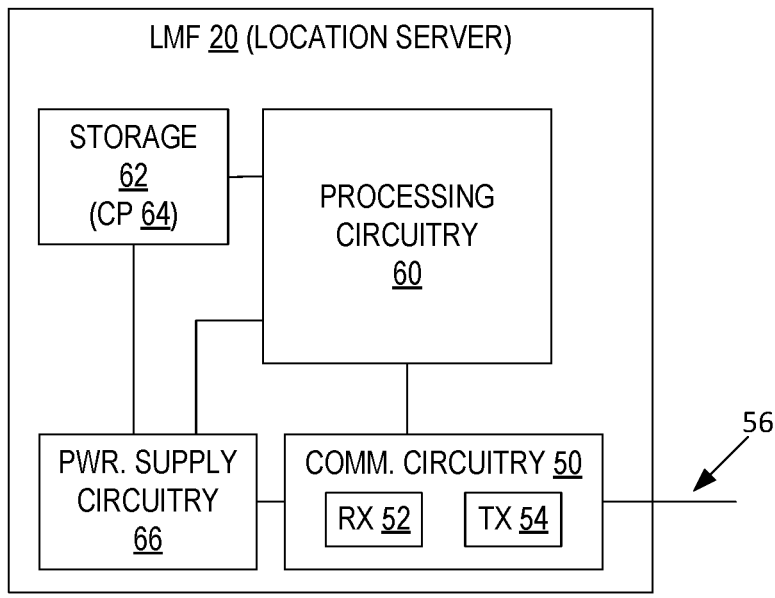
FIG. 8 is a block diagram of one embodiment of a location server.

FIG. 8 illustrates an example location server 20 according to one or more embodiments. The location server 20 includes communication circuitry 50, which is configured for transceiver operations and comprises receiver circuitry 52 and transmitter circuitry 54. In at least one example, the communication circuitry 50 is configured as a computer-data network interface, for communication with one or more nodes in a wireless communication network 10, such as the radio network nodes 16 shown in FIG. 1. As such, the communication circuitry 50 provides or is associated with a network interface 56, for inter-node communications. The location server 20 may communicate according to one or more protocols, such as one or more protocols for communications exchanged with a radio network node 16 and one or more protocols for communications exchanged with a wireless device 14 (as conveyed through a radio network node 16).

The location server 20 further includes processing circuitry 60 that is operatively associated with the communication circuitry 50. In at least one embodiment, the location server 20 includes storage 62, which may store one or more computer programs (CP) 64 that comprise computer program instructions for execution by one or more processors that may be included in or comprise the processing circuitry 60 to perform the methods described herein, for example the method described above with reference to FIG. 2. Still further, the location server 20 includes power supply circuitry 66.

The processing circuitry 60 comprises fixed circuitry or programmatically-configured circuitry or a mix of fixed and programmatically-configured circuitry. By way of example, the processing circuitry 60 comprises one or more types of digital processors that are specially adapted (configured) to carry out the location-server operations described herein, based on the execution of computer program instructions stored in the storage 62. To that end, the storage 62 in one or more embodiments comprises one or more types of computer-readable media. Examples include EEPROM, FLASH, Solid State Disk (SSD), SRAM/DRAM, etc. The storage 62 may comprise a mix of short-term (volatile) and longer-term (non-volatile) memory or storage devices, such as working RAM for program execution and nonvolatile memory for program storage.

With FIG. 8 in mind, a location server 20 is configured for operation in association with a wireless communication network 10 and includes communication circuitry 50 that is configured to communicatively couple the location server 20 to one or more nodes of the wireless communication network 10. Further, the location server 20 includes processing circuitry 60 that is operatively associated with the communication circuitry 50 and configured to:

(a) determine a timing recommendation for a serving one of the base stations 16, (e.g. according to timing information from the serving base station 16), the timing recommendation being an activation-time recommendation for the wireless device (14) to activate the aperiodic or semipersistent SRS configuration; and (b) send the timing recommendation to the serving base station 16, as a request to the serving base station 16 to trigger activation of the aperiodic or semipersistent SRS configuration by the wireless device 14.

The processing circuitry 60 may be further configured to determine a need to activate the aperiodic or semipersistent SRS configuration. The processing circuitry 60 may be further configured to, based on the return information from the serving base station 16, a time at which one or more further base stations 16 should listen for the aperiodic or semipersistent SRS transmissions by the wireless device 14, and send an indication to the one or more further base stations 16 among the plurality of base stations 16, indicating a time at which the one or more further base stations 16 should listen for the aperiodic or semipersistent SRS transmissions by the wireless device 14.

The processing circuitry 60 is configured to determine the need to activate the aperiodic or semipersistent SRS transmissions by the wireless device 14, for example, as a response to a positioning event, for positioning the wireless device 14. In a particular example, the location server 20 determines the need to activate the aperiodic or semipersistent SRS transmissions responsive to determining that additional SRS are needed to support the contemplated positioning operation, as compared to the SRS density provided by a current SRS configuration of the wireless device 14. For example, the current configuration provides for periodic SRS transmissions according to a defined periodicity and the location server 20 determines an aperiodic or semipersistent SRS configuration that causes the wireless device 14 to transmit additional SRS during the intervals between its existing periodic SRS transmissions.

Thus, in at least one embodiment, the processing circuitry 60 is configured to determine the need to activate the aperiodic or semipersistent SRS transmissions by the wireless device 14 by determining that a denser reference-signal configuration is needed for the positioning of the wireless device 14. Of course, there may additional or alternative bases for the processing circuitry 60 deciding that there is a need to activate aperiodic or semipersistent SRS transmissions by the wireless device 14.

In one example or implementation, the wireless device 14 is configured for periodic SRS transmissions—e.g., its existing SRS configuration—and the processing circuitry 60 is configured to determine an aperiodic SRS configuration for the wireless device 14, to cause the aperiodic SRS transmissions to occur between the periodic SRS transmissions. As another example, the wireless device 14 is configured for semipersistent SRS transmissions, and the processing circuitry 60 is further configured to determine an aperiodic SRS configuration for the wireless device 14, to cause the aperiodic SRS transmissions to occur between the semipersistent SRS transmissions.

The timing information provided to the location server 20 from the serving base station 16 comprises scheduling information from the serving base station 16. The processing circuitry 60 may be further configured to receive return information from the serving base station 16, in response to the timing recommendation sent by it to the serving base station 16. The return information indicates an activation time determined by the serving base station 16, for activating the aperiodic or semipersistent SRS transmissions by the wireless device 14. Advantageously, then, based on receiving the timing information from the serving base station 16, the location server 20 can consider the positioning operations to be performed, the current SRS configuration of the wireless device 14, and the timing of the serving base station 16 (e.g., scheduling information), and make an informed recommendation about when the SRS adjustments should be activated for the wireless device 14. As a further advantage, the arrangement leaves the serving base station 16 in control of the final decision regarding the activation time, meaning that it can adjust for scheduling priorities, etc.

The indication sent from the location server 20 to the one or more further base stations 16 may be expressed in terms of a radio frame timing structure used by the serving base station 16 and the one or more further base stations 16. The indication indicates a subframe or slot within the radio frame timing structure, for example, or an offset from a subframe or slot. In further timing-detail examples, the activation-timing recommendation sent from the location server 20 to the serving base station 16 may be expressed relative to a reference time known to the serving base station 16.

Figure 9:
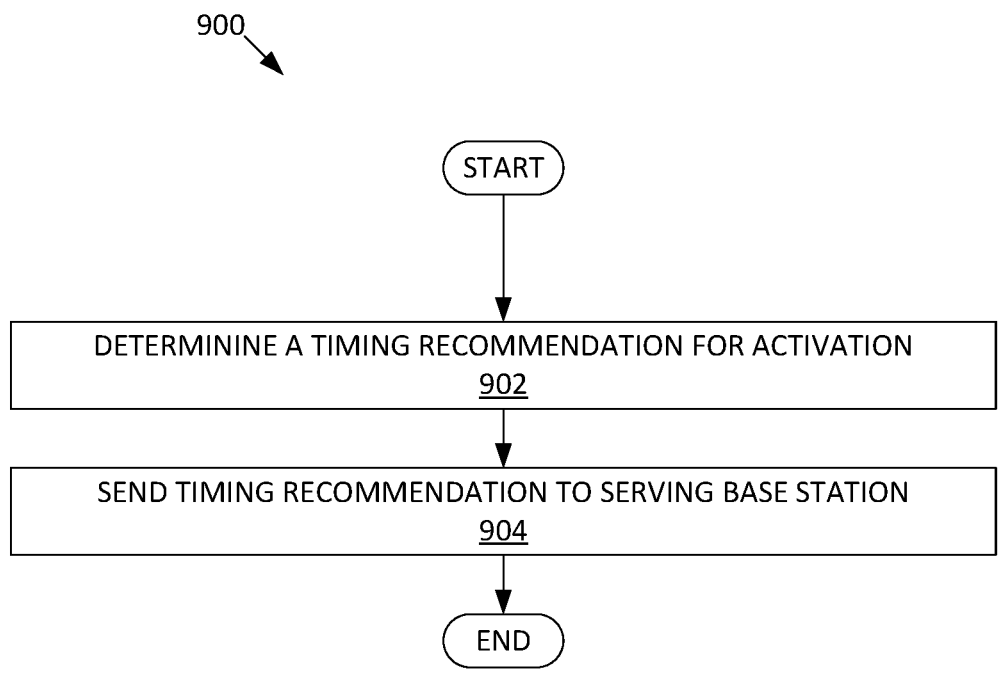
FIG. 9 is a logic flow diagram of one embodiment of a method of operation by a location server.

FIG. 9 illustrates a method 900 of operation by a location server 20, where the method 900 includes:
- determining (Block 902) a timing recommendation for a serving one of the base stations 16, e.g. according to timing information from the serving base station 16, the timing recommendation being an activation-time recommendation for the wireless device 14 to activate the aperiodic or semipersistent SRS configuration; and
- sending (Block 904) the timing recommendation to the serving base station 16, as a request to the serving base station 16 to trigger the activation of the aperiodic or semipersistent SRS configuration by the wireless device 14.

In one example, the method also comprises determining the need to activate the aperiodic or semipersistent SRS transmissions by the wireless device 14. This determining step may comprise a response to a positioning event, for positioning the wireless device 14. Determining the need to activate the aperiodic or semipersistent SRS configuration by the wireless device 14 in another example comprises determining that a denser reference-signal configuration is needed for the positioning of the wireless device 14.

Consider a scenario where the wireless device 14 is configured for periodic SRS transmissions. Correspondingly, the method 900 may further comprise the location server determining an aperiodic SRS configuration for the wireless device 14, to cause the aperiodic SRS transmissions to occur between the periodic transmissions. In another example, the wireless device 14 is configured for semipersistent SRS transmissions, and the method 900 further comprises determining an aperiodic SRS configuration for the wireless device 14, to cause the aperiodic SRS transmissions to occur between the semipersistent SRS transmissions.

The method 900 may further include the location server 20:
- receiving return information from the serving base station 16, in response to the timing recommendation, the return information indicating an activation time determined by the serving base station 16, for activating the aperiodic or semipersistent SRS configuration by the wireless device 14;
- determining, based on the return information from the serving base station 16, a time at which one or more further base stations 16 should listen for the aperiodic or semipersistent SRS transmissions by the wireless device 14; and
- sending an indication to the one or more further base stations 16 among the plurality of base stations 16, indicating a time at which the one or more further base stations 16 should listen for the aperiodic or semipersistent SRS transmissions by the wireless device 14.

The indication sent to the one or more further base stations 16 is expressed in terms of a radio frame timing structure used by the serving base station and the one or more further base stations 16, for example. The indication indicates, for example, a subframe or slot within the radio frame timing structure, or an offset from a subframe or slot. Similarly, the activation-timing recommendation is expressed relative to a reference time known to the serving base station 16.

Figure 10:
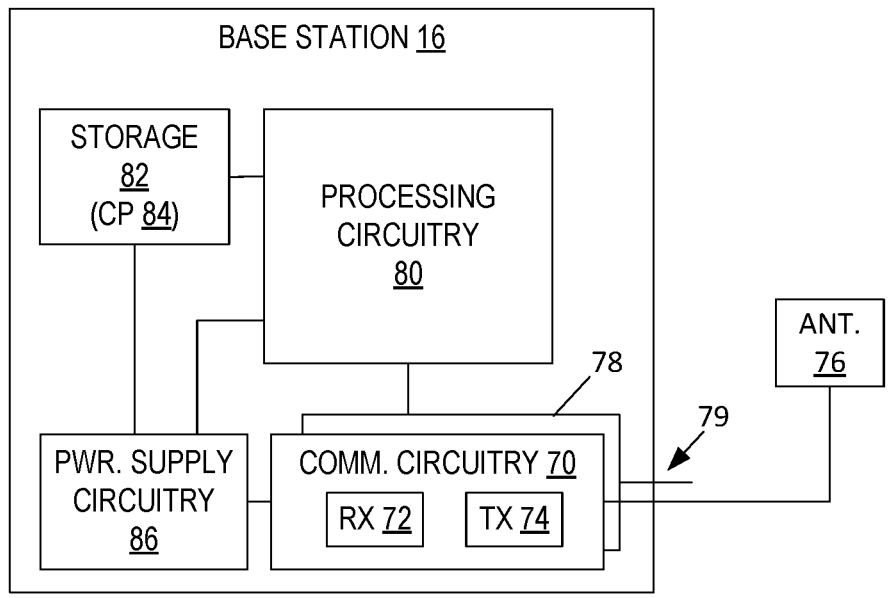
FIG. 10 is a block diagram of one embodiment of a radio network node, also referred to as a base station.

FIG. 10 illustrates an example radio network node 16 (denoted as a "base station") according to one or more embodiments. The base station 16 includes communication circuitry 70, which is configured for transceiver operations and comprises receiver circuitry 72 and transmitter circuitry 74. In at least one example, the communication circuitry 70 is configured for radiofrequency signal transmission and reception—e.g., to provide a wireless network air interface according to one or more RATs, for communicatively coupling the base station 16 with wireless devices 14. The communication circuitry 70 includes or is associated with one or more antennas 76, e.g., with one or more arrays of antenna elements configured for beamformed transmission and/or reception operations, for DL transmission and UL reception.

The base station 16 further includes communication circuitry 78 which provides a network interface connection 79 to one or more other nodes in the wireless communication network 10, such as communicatively coupling the base station 16 to a location server 20 and/or other core-network nodes of the wireless communication network 10.

The base station 16 further includes processing circuitry 80 that is operatively associated with the communication circuitry 70/78. In at least one embodiment, the base station 16 includes storage 82, which may store one or more computer programs (CP) 84 that comprise computer program instructions for execution by one or more processors that may be included in or comprise the processing circuitry 80 to perform the methods herein, for example the method described with reference to FIG. 3. Still further, the base station 16 includes power supply circuitry 86.

The processing circuitry 80 comprises fixed circuitry or programmatically-configured circuitry or a mix of fixed and programmatically-configured circuitry. By way of example, the processing circuitry 80 comprises one or more types of digital processors that are specially adapted (configured) to carry out the serving-base-station operations described herein, based on the execution of computer program instructions stored in the storage 82. To that end, the storage 82 in one or more embodiments comprises one or more types of computer-readable media. Examples include EEPROM, FLASH, Solid State Disk (SSD), SRAM/DRAM, etc. The storage 82 may comprise a mix of short-term (volatile) and longer-term (non-volatile) memory or storage devices, such as working RAM for program execution and nonvolatile memory for program storage.

With FIG. 10 in mind, a base station 16 is configured for operation in association with a wireless communication network 10 and includes communication circuitry 70/78 that is configured to communicatively couple the base station 16 to one or more nodes of the wireless communication network 10, such as a location server 20. Further, the base station 16 includes processing circuitry 80 that is operatively associated with the communication circuitry 70/78 and configured to:

(a) receive a timing recommendation from a location server 20, for a wireless device 14 for which the base station 16 operates as a serving base station 16, the timing recommendation being an activation-time recommendation for activating an aperiodic or semipersistent SRS configuration at the wireless device 14, e.g. for positioning of the wireless device 14 via UTDOA measurements made by a plurality of base stations 16, including the serving base station 16 as a "first" base station;

(b) send an indication of the aperiodic or semipersistent SRS configuration to the wireless device 14, according to the activation time.

The processing circuitry 80 may be further configured to perform the step of determining an activation time for the aperiodic or semipersistent SRS configuration, in consideration of the timing recommendation. The processing circuitry 80 may be further configured to send an indication of the activation time to the location server 20.

The processing circuitry 80 is configured to trigger the activation of the aperiodic or semipersistent SRS configuration by the wireless device 14 by, for example, sending downlink control signaling to the wireless device 14, thereby configuring the wireless device 14 to activate the aperiodic or semipersistent SRS configuration according to the activation time. Additionally, in one or more embodiments, the processing circuitry 80 is configured to send timing information for the first base station 16 to the location server 20, for use by the location server 20 in determining the activation-time recommendation. The activation time can be expressed as an offset relative to a reference time associated with a radio frame timing structure used by the first base station 16 and the wireless device 14, for example. The activation time may be expressed as a subframe or slot offset from a reference time.

In determining the activation time for the aperiodic or semipersistent SRS configuration, the processing circuitry 80 may be configured to deviate from the activation-time recommendation in dependence on ongoing radio resource scheduling at the first radio base station 16. Further, the processing circuitry 80 may be configured to configure the aperiodic or semipersistent SRS configuration of the wireless device 14, according to configuration information received from the location server 20 in conjunction with the activation-time recommendation.

Figure 11:
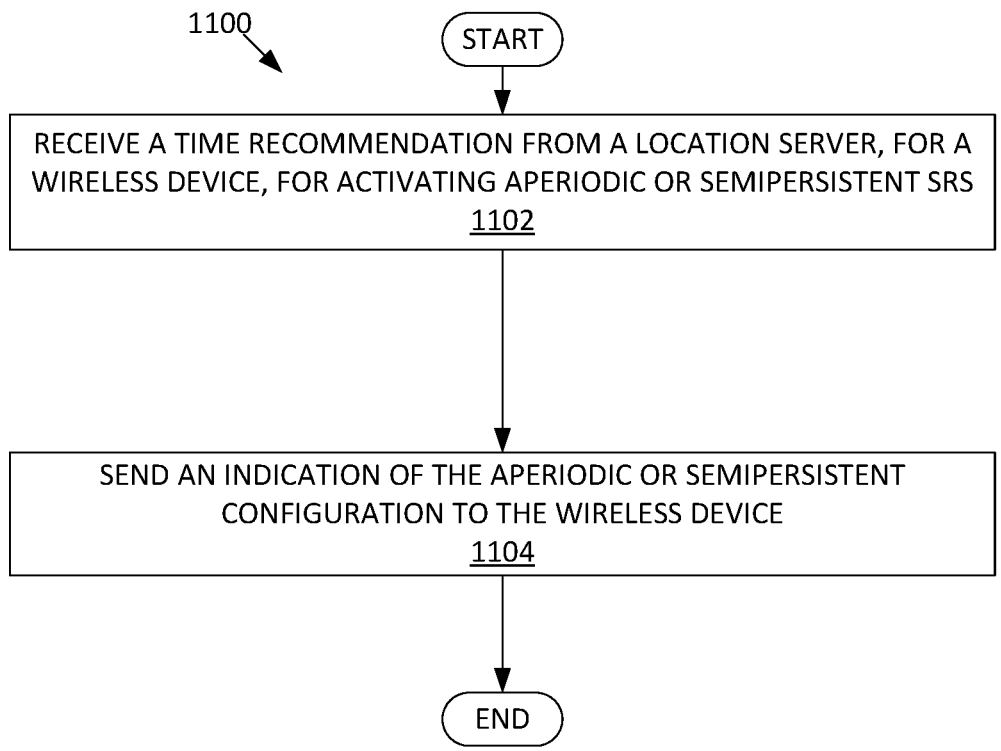
FIG. 11 is a logic flow diagram of one embodiment of a method of operation by a base station.

FIG. 11 illustrates a method 1100 of operation by a base station 16, referred to as a "first" base station for clarity. The method 1100 includes:

(a) receiving (Block 1102) a timing recommendation from a location server 20, for a wireless device 14 for which the first base station 16 operates as a serving base station 16, the timing recommendation being an activation-time recommendation for activating an aperiodic or semipersistent SRS configuration at the wireless device 14, e.g. for positioning of the wireless device 14 via UTDOA measurements made by a plurality of base stations 16, including the first base station 16;

(b) send an indication of the aperiodic or semipersistent SRS configuration to the wireless device (14), according to the activation time.

The method may further comprise determining an activation time for the aperiodic or semipersistent SRS transmissions, in consideration of the timing recommendation; it may further comprise sending (Block 1106) an indication of the activation time to the location server 20.

Sending the indication of the aperiodic or semipersistent SRS configuration to the wireless device 14 comprises, for example, sending downlink control signaling to the wireless device 14, thereby configuring the wireless device 14 to activate the aperiodic or semipersistent SRS configuration according to the activation time.

The method 1100 may also include the first base station 16 sending timing information for the first base station 16 to the location server 20, for use by the location server 20 in determining the activation-time recommendation. The activation time may be expressed as an offset relative to a reference time associated with a radio frame timing structure used by the first base station 16 and the wireless device 14. For example, the activation time is expressed as a subframe or slot offset from a reference time.

Determining the activation time for the aperiodic or semipersistent SRS configuration comprises, as an example, the first base station 16 deviating from the activation-time recommendation from the location server 20, in dependence on ongoing radio resource scheduling at the first radio base station 16.

The method 1100 may also include the first base station 16 configuring the aperiodic or semipersistent SRS configuration by the wireless device 14, according to configuration information received from the location server 20 in conjunction with the activation-time recommendation.

Figure 12:
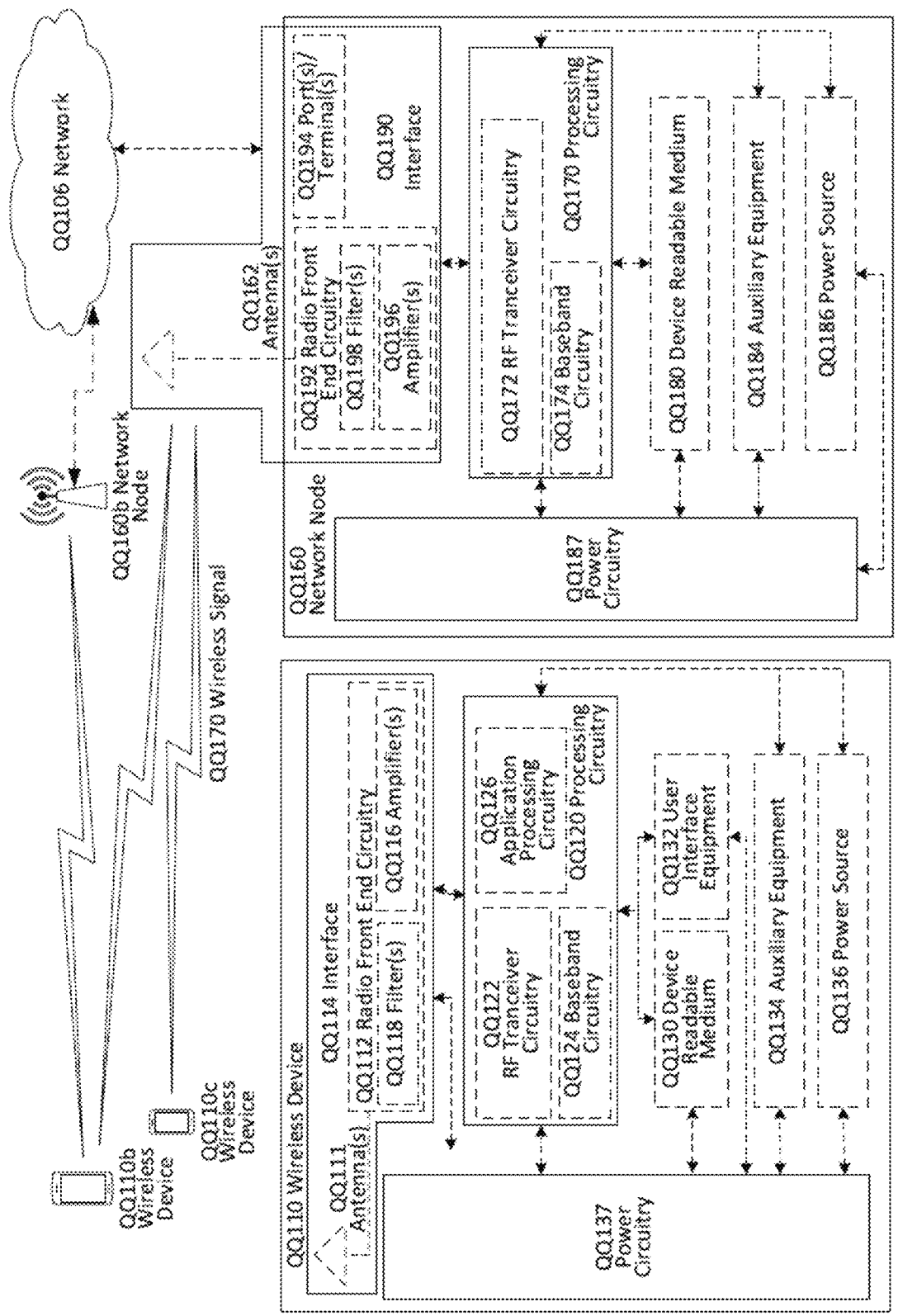
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and wireless devices QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device QQ110 are depicted with additional detail. Network node QQ160 may comprise a radio network node 16 as described earlier herein. Wireless device QQ110 may comprise a wireless device 14 as described earlier herein. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and wireless device QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or wireless devices QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or wireless devices via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, "wireless device" refers to a device capable, configured, arranged and/or operable to communicate wirelessly with network nodes and/or other wireless devices. Unless otherwise noted, the term "wireless device" may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. The wireless device QQ110 may include multiple sets of one or more of the illustrated components for different wireless technologies supported by wireless device QQ110, such as, for example, GSM, WCDMA, LTE, NR, WiFi, WiMAX, or Bluetooth wireless technologies, just to mention a few. These wireless technologies may be integrated into the same or different chips or set of chips as other components within wireless device QQ110.

Antenna QQ111 may include one or more antennas or antenna arrays, configured to send and/or receive wireless signals, and is connected to interface QQ114. In certain alternative embodiments, antenna QQ111 may be separate from wireless device QQ110 and be connectable to wireless device QQ110 through an interface or port. Antenna QQ111, interface QQ114, and/or processing circuitry QQ120 may be configured to perform any receiving or transmitting operations described herein as being performed by a wireless device. Any information, data and/or signals may be received from a network node and/or another wireless device. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120 and is configured to condition signals communicated between antenna QQ111 and processing circuitry QQ120. Radio front end circuitry QQ112 may be coupled to or a part of antenna QQ111. In some embodiments, wireless device QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or wireless devices via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device QQ110 components, such as device readable medium QQ130, wireless device QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of wireless device QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a wireless device may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of wireless device QQ110, but are enjoyed by wireless device QQ110 as a whole, and/or by end users and the wireless network generally.

Processing circuitry QQ120 may be configured to perform any determining, calculating, or similar operations (e.g., certain obtaining operations) described herein as being performed by a wireless device. These operations, as performed by processing circuitry QQ120, may include processing information obtained by processing circuitry QQ120 by, for example, converting the obtained information into other information, comparing the obtained information or converted information to information stored by wireless device QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with wireless device QQ110. Such interaction may be of many forms, such as visual, audial, tactile, etc. User interface equipment QQ132 may be operable to produce output to the user and to allow the user to provide input to wireless device QQ110. The type of interaction may vary depending on the type of user interface equipment QQ132 installed in wireless device QQ110. For example, if wireless device QQ110 is a smart phone, the interaction may be via a touch screen; if wireless device QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into wireless device QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from wireless device QQ110, and to allow processing circuitry QQ120 to output information from wireless device QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, wireless device QQ110 may communicate with end users and/or the wireless network and allow them to benefit from the functionality described herein.

Auxiliary equipment QQ134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. The wireless device QQ110 may further comprise power circuitry QQ137 for delivering power from power source QQ136 to the various parts of wireless device QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case wireless device QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of wireless device QQ110 to which power is supplied.

Figure 13:
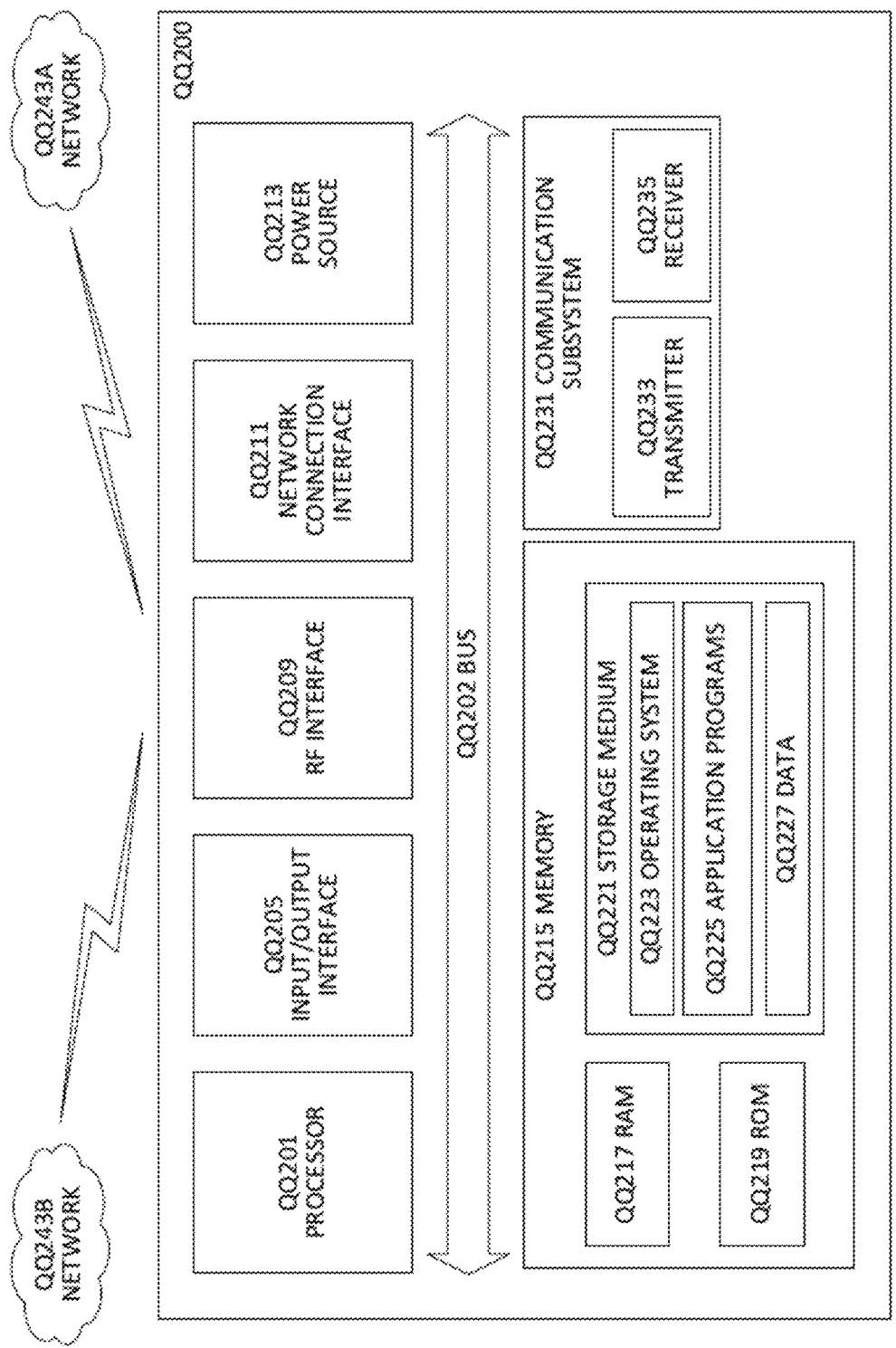
FIG. 13 is a block diagram of a user equipment according to some embodiments.

FIG. 13 illustrates one embodiment of a UE in accordance with various aspects described herein. UE QQ200 may comprise a wireless device 14 as described earlier herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
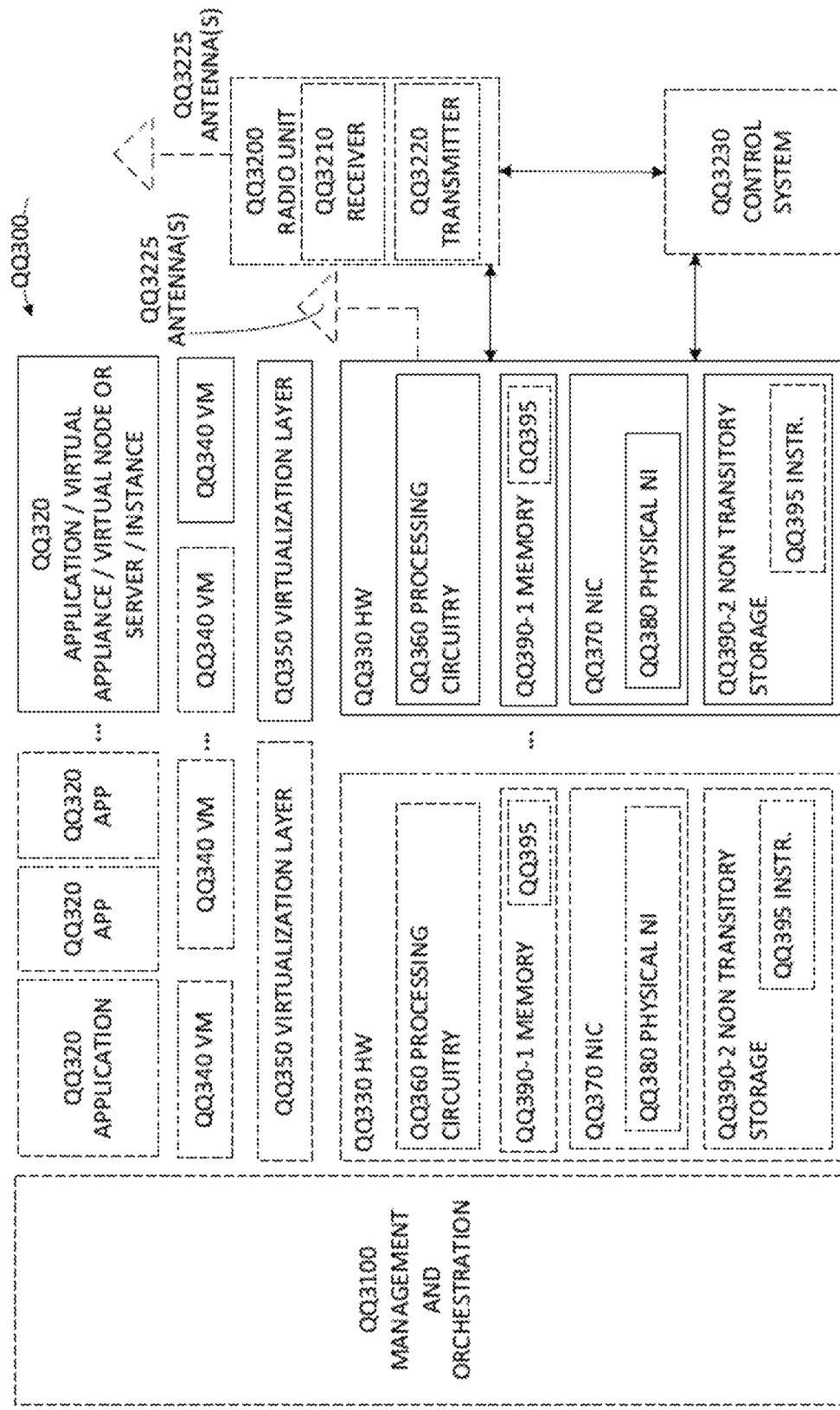
FIG. 14 is a block diagram of a virtualization environment according to some embodiments.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
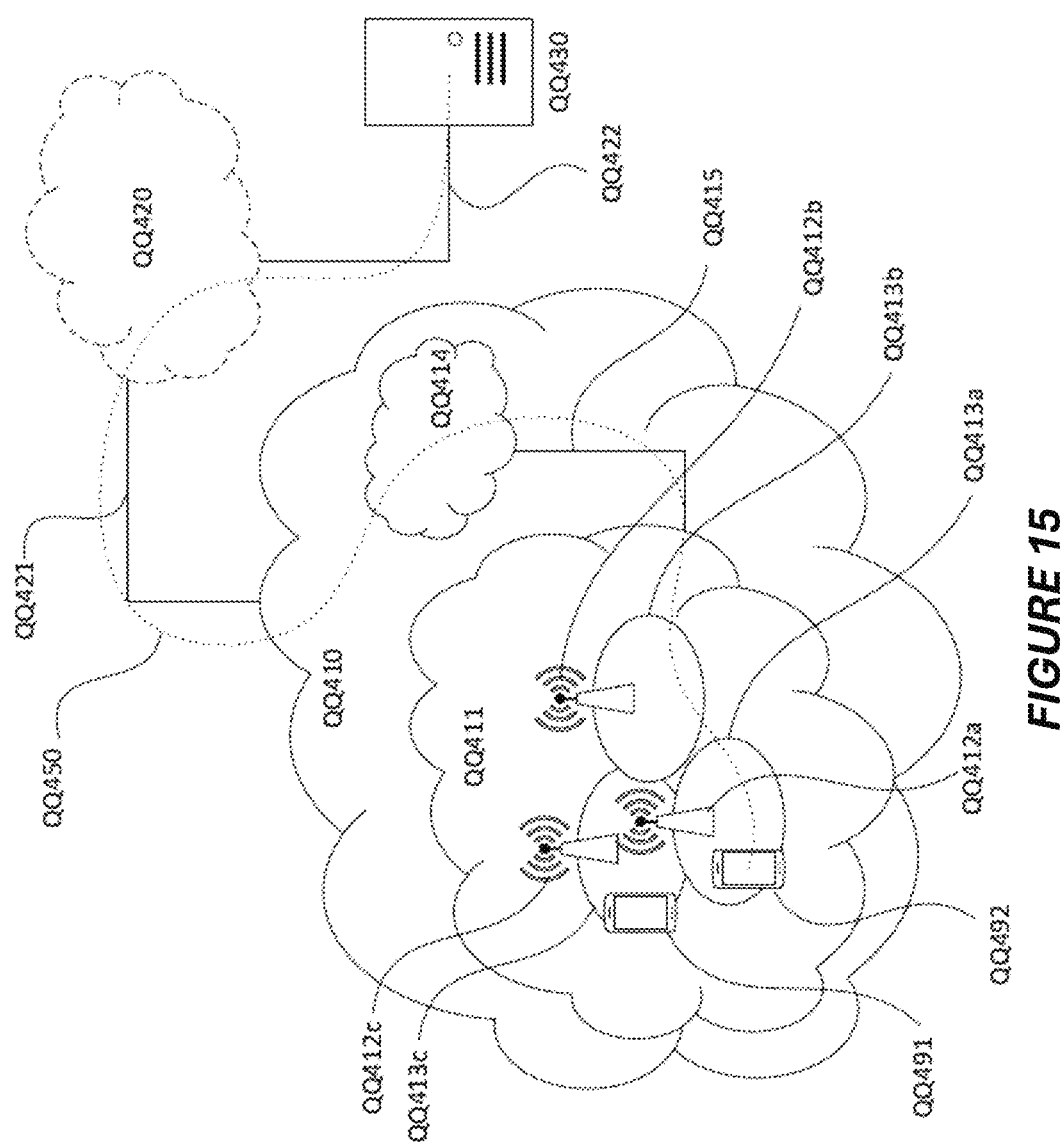
FIG. 15 is a block diagram of a communication network with a host computer according to some embodiments.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 16:
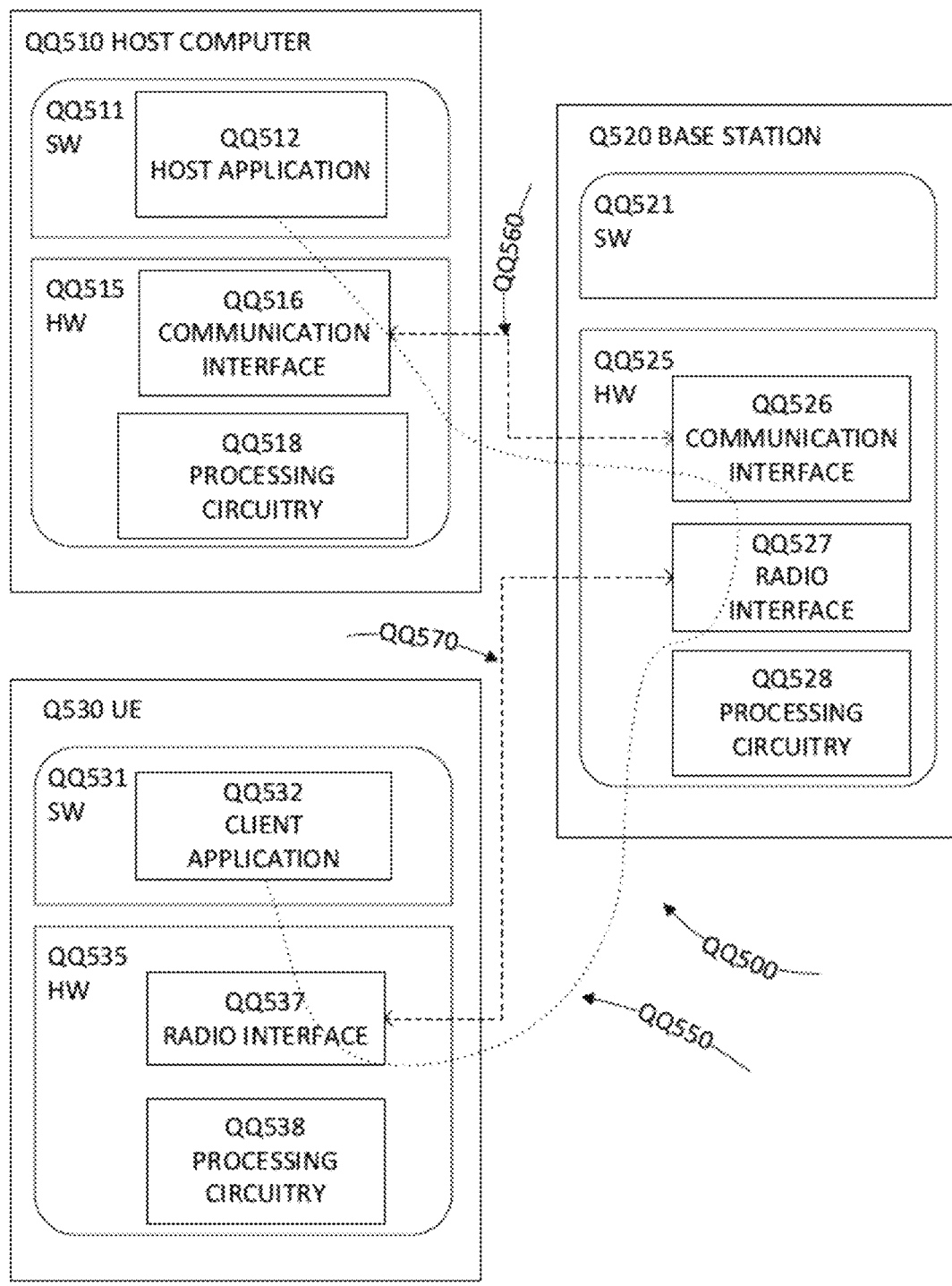
FIG. 16 is a block diagram of a host computer according to some embodiments.

It is noted that host computer QQ510, base station QQ520 and UE QQ530 illustrated in FIG. 16 may be similar or identical to host computer QQ430, one of base stations QQ412*a*, QQ412*b*, QQ412*c* and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. For example, the teachings of these embodiments may improve the power consumption and thereby provide benefits such as extended battery lifetime. As another example, dynamic or triggered PRS or SRS configuration may provide improvements in positioning for location-related services used by or in association with communications going between a UE and a host computer.

A measurement procedure may be provided for the purpose of monitoring data rate, latency, and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
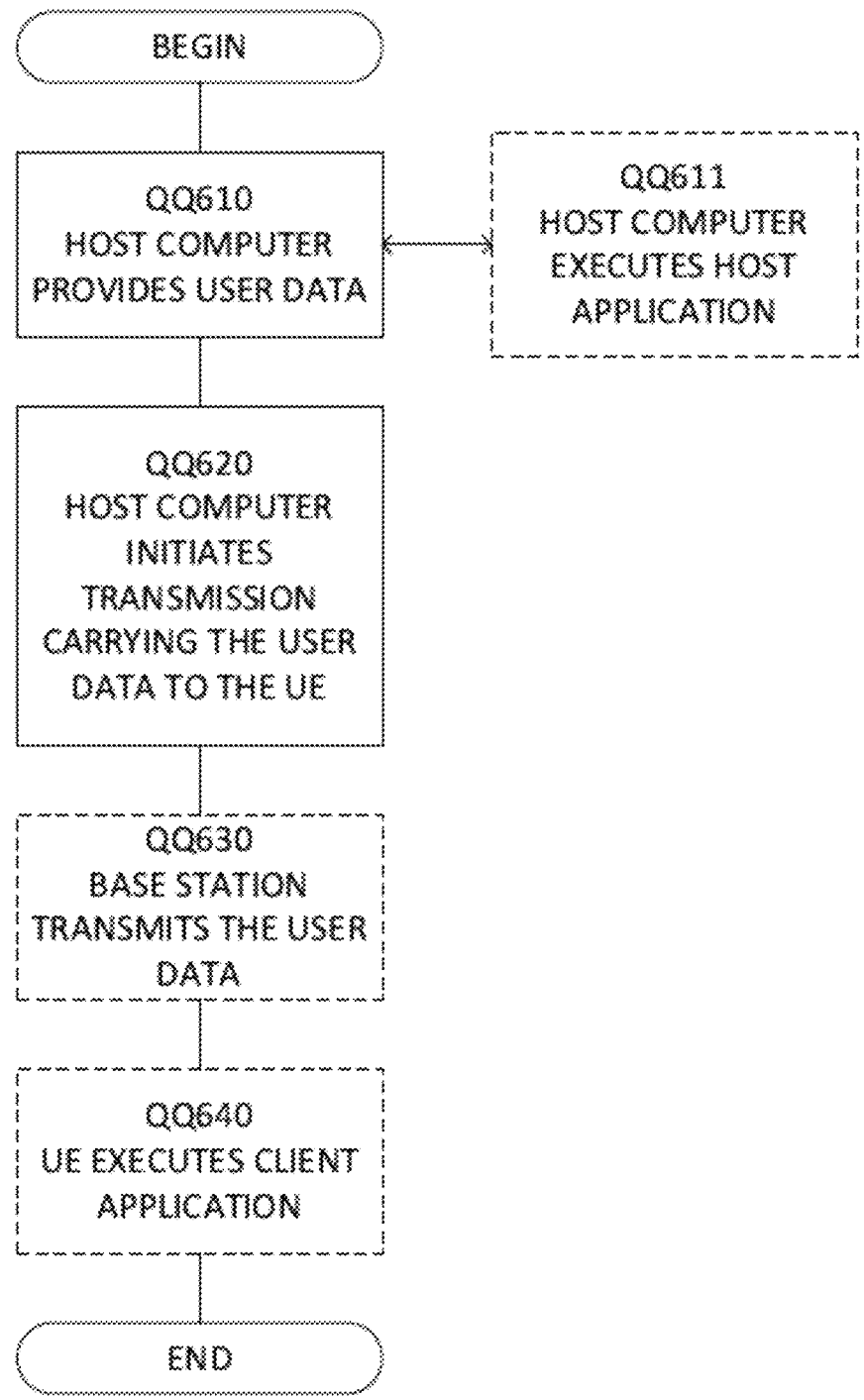
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 18:
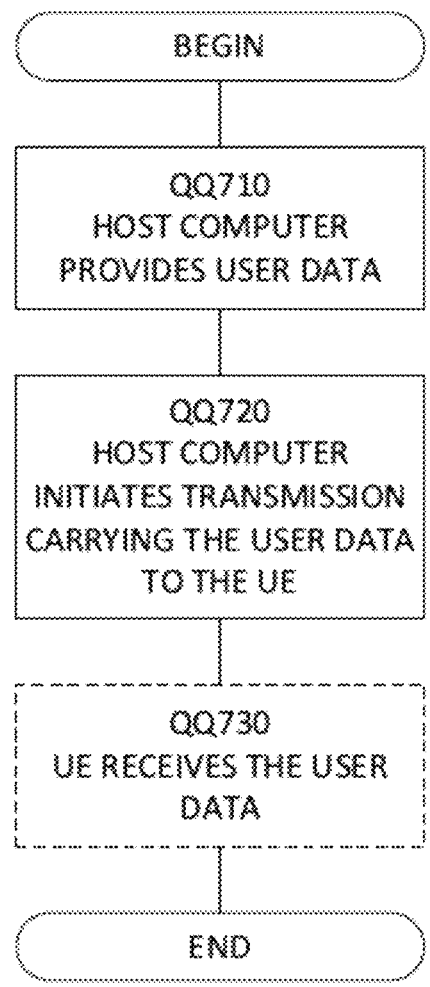
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step QQ710 of the method, the host computer provides user data. In an optional sub-step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 19:
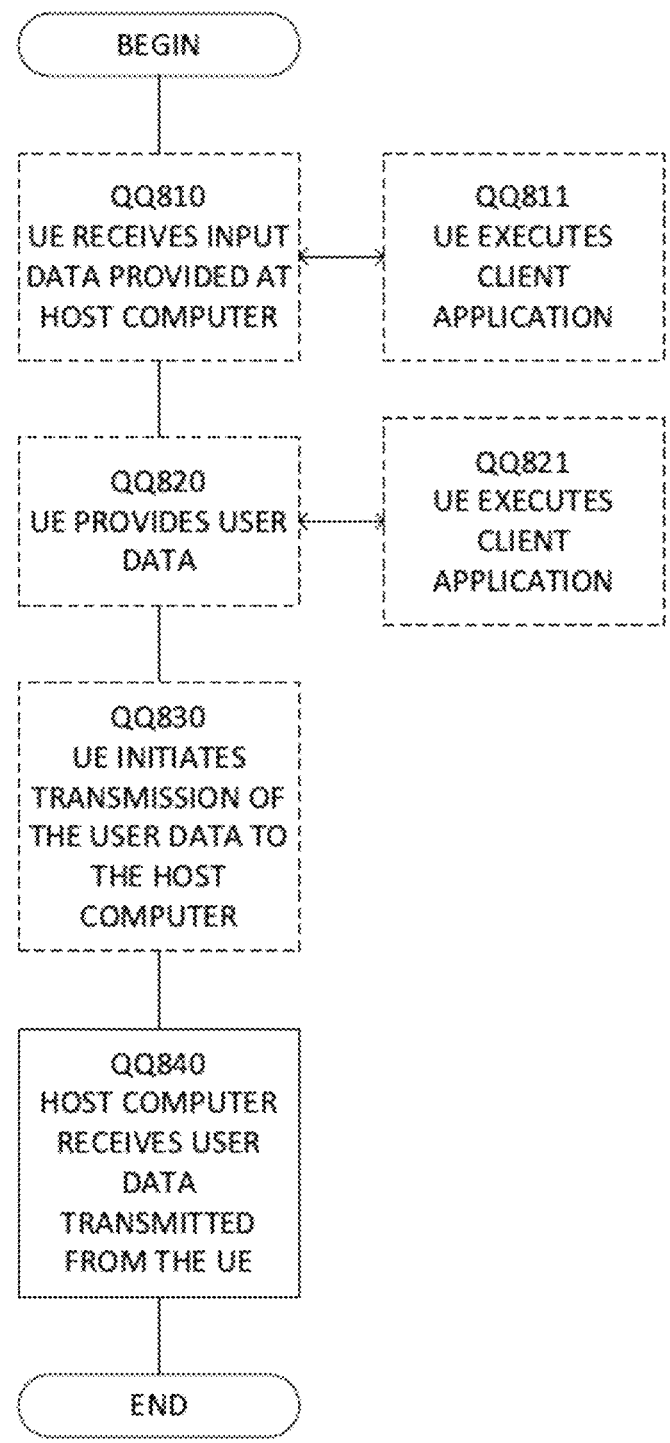
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step QQ810 (which may be optional), the UE receives input data provided by the host computer. Additionally, or alternatively, in step QQ820, the UE provides user data. In sub-step QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in sub-step QQ830 (which may be optional), transmission of the user data to the host computer. In step QQ840 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 21 illustrates a schematic block diagram of an apparatus VV100 in a wireless network (for example, the wireless networks shown in FIGS. 1 or 12). The apparatus VV100 may be implemented in location sever. Apparatus VV100 includes a processing unit VV102 and a transmission/reception unit VV104 and is operable to carry out the example method(s) described herein for a location server, such as the location server 20 introduced in FIG. 1.

The virtual apparatus VV100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The processing unit VV102 carries out the processing operations and decisions described herein, e.g., with respect to FIGS. 2, 3, 5, 6, and 9, while the transmission/reception unit VV104 provides the communicative coupling used for exchanging information with radio network nodes, e.g., nodes 16, and wireless devices, e.g., wireless devices 14.

FIG. 22 illustrates a schematic block diagram of an apparatus VV200 in a wireless network (for example, the wireless network shown in FIG. 1 or 12). The apparatus may be implemented in a radio network node (also referred to as a base station). The apparatus VV200 is operable to carry out any or all of the example methods described herein for a radio network node 16.

Virtual Apparatus VV200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The processing unit VV202 is configured to carry out the operations and decision-making described herein for a radio network node, e.g., the serving-node operations depicted in FIGS. 3, 4, 5, and 11. Correspondingly, the transmission/reception unit VV204 is configured to provide the communicative coupling—the exchange of signaling—with, for example, a location server 20 and/or a wireless device 14.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the foregoing descriptions.

Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

FURTHER EXAMPLE EMBODIMENTS

Group AA Embodiments

1. A method performed by a location server for providing a reference signal configuration for use in determining a positioning measurement, the method comprising:
   indicating a first reference signal configuration to a radio network node or a wireless device;
   receiving feedback information from the radio network node or the wireless device;
   determining a third reference signal configuration based on the feedback information; and
   initiating use of the third reference signal configuration by the radio network node or the wireless device.

2. The method of embodiment 1 wherein the third reference signal configuration is the same as the first reference signal configuration.

3. The method of embodiment 1 wherein the first reference signal configuration and the third reference signal configuration comprises a Positioning Reference Signal (PRS) configuration and/or a sounding reference signal (SRS) configuration.

4. The method of embodiment 1 wherein the step of determining comprising:
   analyzing the feedback information to determine whether the first reference signal configuration is sufficient;
   responsive to the first reference signal configuration being sufficient, setting the third reference signal configuration as the first reference signal configuration; and
   responsive to the first reference signal configuration not being sufficient, updating the first reference signal configuration based on the feedback information to generate the third reference signal configuration.

5. The method of embodiment any previous embodiment wherein the feedback information comprises an indication of a second reference signal configuration.

6. The method of embodiment 5 when dependent on claim 4 further comprising:
   responsive to the first reference signal configuration not being sufficient, setting the third reference signal configuration as the second reference signal configuration.

7. The method of embodiment 5 when dependent on any one of claims 1 to 3 further comprising:
   setting the third reference signal configuration as the second reference signal configuration.

8. The method of any previous embodiment wherein the feedback information comprise one or more of: Positioning Reference signal (PRS) measurements based on the first reference signal configuration; feedback on received PRS signal quality or quality of PRS-based measurements based on the first reference signal configuration; Sounding Reference Signal (SRS) measurements based on the first reference signal configuration; feedback on received SRS signal quality or quality of SRS-based measurements based on the first reference signal configuration; a desired value for a parameter of the third reference signal configuration; an indication that a parameter of the first reference signal configuration needs updating; an indication of a beam or SSB quality; an indication of N, where N is an integer, best beams for each of one or more cells; an indication that PRS should be configured for a particular wireless device; and an indication that PRS is not needed for a particular wireless device.

9. The method of any previous embodiment further comprising:
   transmitting an indication of when the third reference signal configuration should be implemented.

10. The method of any one of embodiments 1 to 8 further comprising:
    transmitting an indication to the radio based station as to when the third reference signal configuration should be triggered in a particular wireless device.

Group A Embodiments

11. A method performed by a wireless device for updating a reference signal configuration for use in determining a positioning measurement, the method comprising:
    utilizing a first reference signal configuration; and
    responsive to receiving an indication of a third reference signal configuration from a radio network node or a location server, utilize the third reference signal configuration.

12. The method of embodiment 11 wherein the first reference signal configuration and the third reference signal configuration comprises a Positioning Reference Signal (PRS) configuration and/or a sounding reference signal (SRS) configuration.

13. The method of embodiment 11 or 12 further comprising:
    transmitting feedback information to the location server and/or the radio network node.

14. The method of embodiment 13 wherein the feedback information comprises one or more of: Positioning Reference Signal (PRS) measurements based on the first reference signal configuration; feedback on received PRS signal quality or quality of PRS-based measurements based on the first reference signal configuration; a desired value for a parameter of the third reference signal configuration; an indication that a parameter of the first reference signal configuration needs updating; an indication of a beam or SSB quality; and an indication of N, where N is an integer, best beams for each of one or more cells.

15. The method of any one of embodiments 11 to 14 wherein the step of utilizing the third reference signal configuration comprises one or more of:
    receiving PRS according to the third reference signal configuration,
    transmitting SRS according to the third reference signal configuration, and
    performing a positioning measurement involving SRS according to the third reference signal configuration.

16. The method of any of the previous embodiments, further comprising:
    providing user data; and
    forwarding the user data to a host computer via the transmission to the radio network node.

Group B Embodiments

17. A method performed by a radio network node for updating a reference signal configuration for use in determining a positioning measurement, the method comprising:
    receiving an indication of a first reference signal configuration from a location sever;
    transmitting feedback information to the location server relating to the first reference signal configuration;
    obtaining a third reference signal configuration based on the feedback information; and
    utilizing the third reference signal configuration.

18. The method of embodiment 17, wherein the first reference signal configuration and the third reference signal configuration comprises a Positioning Reference Signal (PRS) configuration and/or a sounding reference signal (SRS) configuration.

19. The method of any one of embodiments 17 to 19 wherein the feedback information comprises an indication of a second reference signal configuration.

20. The method of embodiment 19 wherein the third reference signal configuration comprises the second reference signal configuration.

21. The method of any one of embodiments 17 to 19 wherein the third reference signal configuration is the same as the first reference signal configuration.

22. The method of embodiments 19 further comprising:
    determining the second reference signal configuration based on feedback received from a wireless device.

23. The method of any one of embodiments 17 to 22 wherein the step of utilizing comprises one or more of:
    triggering a wireless device to use the third reference signal configuration;

transmitting Positioning Reference Signals according to the third reference signal configuration;
receiving Sounding Reference Signals from a wireless device according to the third reference signal configuration;
performing a positioning measurement according to the third reference signal configuration;
configuring a wireless device to perform a positioning measurement according to the third reference signal configuration;
reporting to the location sever or another radio network node a positioning measurement based on the third reference signal configuration; and
transmitting an indication of the third reference signal configuration to another radio network node.

24. The method of any of the previous embodiments, further comprising:
obtaining user data; and
forwarding the user data to a host computer or a wireless device.

Group C Embodiments

25. A wireless device for updating a reference signal configuration for use in determining a positioning measurement, the wireless device comprising:
processing circuitry configured to perform any of the steps of any of the Group A embodiments; and
power supply circuitry configured to supply power to the wireless device.

26. A base station for updating a reference signal configuration for use in determining a positioning measurement, the base station comprising:
processing circuitry configured to perform any of the steps of any of the Group B embodiments;
power supply circuitry configured to supply power to the base station.

27. A user equipment (UE) for updating a reference signal configuration for use in determining a positioning measurement, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

28. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

29. The communication system of the previous embodiment further including the base station.

30. The communication system of the previous 2 embodiments, further including the UE, wherein the UE is configured to communicate with the base station.

31. The communication system of the previous 3 embodiments, wherein:
the processing circuitry of the host computer is configured to execute a host application, thereby providing the user data; and
the UE comprises processing circuitry configured to execute a client application associated with the host application.

32. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

33. The method of the previous embodiment, further comprising, at the base station, transmitting the user data.

34. The method of the previous 2 embodiments, wherein the user data is provided at the host computer by executing a host application, the method further comprising, at the UE, executing a client application associated with the host application.

35. A user equipment (UE) configured to communicate with a base station, the UE comprising a radio interface and processing circuitry configured to performs the of the previous 3 embodiments.

36. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

37. The communication system of the previous embodiment, wherein the cellular network further includes a base station configured to communicate with the UE.

38. The communication system of the previous 2 embodiments, wherein:
the processing circuitry of the host computer is configured to execute a host application, thereby providing the user data; and
the UE's processing circuitry is configured to execute a client application associated with the host application.

39. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

40. The method of the previous embodiment, further comprising at the UE, receiving the user data from the base station.

41. A communication system including a host computer comprising:
    communication interface configured to receive user data originating from a transmission from a user equipment (UE) to a base station,
        wherein the UE comprises a radio interface and processing circuitry, the UE's processing circuitry configured to perform any of the steps of any of the Group A embodiments.

42. The communication system of the previous embodiment, further including the UE.

43. The communication system of the previous 2 embodiments, further including the base station, wherein the base station comprises a radio interface configured to communicate with the UE and a communication interface configured to forward to the host computer the user data carried by a transmission from the UE to the base station.

44. The communication system of the previous 3 embodiments, wherein:
    the processing circuitry of the host computer is configured to execute a host application; and
    the UE's processing circuitry is configured to execute a client application associated with the host application, thereby providing the user data.

45. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.

46. A method implemented in a communication system including a host computer, a base station and a user equipment (UE), the method comprising:
    at the host computer, receiving user data transmitted to the base station from the UE, wherein the UE performs any of the steps of any of the Group A embodiments.

47. The method of the previous embodiment, further comprising, at the UE, providing the user data to the base station.

48. The method of the previous 2 embodiments, further comprising:
    at the UE, executing a client application, thereby providing the user data to be transmitted; and
    at the host computer, executing a host application associated with the client application.

49. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

50. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

51. The communication system of the previous embodiment further including the base station.

52. The communication system of the previous 2 embodiments, further including the UE, wherein the UE is configured to communicate with the base station.

53. The communication system of the previous 3 embodiments, wherein:
    the processing circuitry of the host computer is configured to execute a host application;
    the UE is configured to execute a client application associated with the host application, thereby providing the user data to be received by the host computer.

54. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.

55. The method of the previous embodiment, further comprising at the base station, receiving the user data from the UE.

56. The method of the previous 2 embodiments, further comprising at the base station, initiating a transmission of the received user data to the host computer.

Abbreviations

AD Assistance Data
SSB Synchronization Signal Block
NR New Radio
OTDOA Observed Time Difference of Arrival
PRS Positioning Reference Signal
CSI-RS Channel State Information Reference Signal
RSTD Reference Signal Time Difference
SIB System Information Block
LOS Line of Sight
NLOS Non-Line of Sight
RE Resource Element
SINR Signal to Interference Noise Ratio
SNR Signal to Noise Ratio
TOA Time of Arrival
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a location server configured for operation in association with a wireless communication network, the method comprising:
  sending a message, to a base station serving a wireless device, as a request to the base station to trigger activation of an aperiodic or semipersistent Sounding Reference Signal (SRS) configuration by the wireless device, the message comprising an indication of the aperiodic or semipersistent SRS configuration and a timing recommendation,
  wherein the timing recommendation is an activation-time recommendation for when the base station should activate the wireless device to start transmission of SRS according to the aperiodic or semipersistent SRS configuration.

2. A location server configured for operation in association with a wireless communication network, the location server comprising:
  communication circuitry configured to communicatively couple the location server to one or more nodes of the wireless communication network; and
  processing circuitry operatively associated with the communication circuitry and configured to:
    send a message, to a base station serving a wireless device, as a request to the base station to trigger activation of an aperiodic or semipersistent Sounding Reference Signal (SRS) configuration by the wireless device, the message comprising an indication of the aperiodic or semipersistent SRS configuration and a timing recommendation,
  wherein the timing recommendation is an activation-time recommendation for when the base station should activate the wireless device to start transmission of SRS according to the aperiodic or semipersistent SRS configuration.

3. A base station configured for operation in association with a wireless communication network, the base station comprising:
communication circuitry configured for communicatively coupling the first base station to one or more wireless devices and for communicatively coupling the first base station to a location server;
processing circuitry operatively associated with the communication circuitry and configured to:
receive from a location server a message requesting the base station to trigger activation of an aperiodic or semipersistent Sounding Reference Signal (SRS) configuration by a wireless device, wherein the message comprises an indication of the aperiodic or semipersistent SRS configuration and a timing recommendation, wherein the timing recommendation is an activation-time recommendation for when the base station should activate the wireless device to start transmitting SRS according to the aperiodic or semipersistent SRS configuration; and
trigger the wireless device to activate the aperiodic or semipersistent SRS configuration.

4. The base station according to claim 3, wherein the processing circuitry is configured to trigger the wireless device to activate the aperiodic or semipersistent SRS configuration by sending an indication of the aperiodic or semipersistent SRS configuration to the wireless device.

5. The base station according to claim 3, wherein the processing circuitry is configured to trigger the wireless device to activate the aperiodic or semipersistent SRS configuration by transmitting a Downlink Control Information (DCI) trigger or a Medium Access Control Element (MAC CE) to the wireless device.

6. The base station according to claim 3, wherein the processing circuitry is configured to trigger the wireless device to activate the aperiodic or semipersistent SRS configuration according to the activation-time recommendation.

7. A method by a base station configured for operation in association with a wireless communication network, the method comprising:
receiving a message, from a location server, requesting the base station to trigger activation of an aperiodic or semipersistent Sounding Reference Signal (SRS) configuration by a wireless device, wherein the message comprises an indication of the aperiodic or semipersistent SRS configuration and a timing recommendation, wherein the timing recommendation is an activation-time recommendation for when the base station should activate the wireless device to start transmitting SRS according to the aperiodic or semipersistent SRS configuration; and
triggering the wireless device to activate the aperiodic or semipersistent SRS configuration.

8. The method according to claim 7, wherein triggering the wireless device to activate the aperiodic or semipersistent SRS configuration comprises sending an indication of the aperiodic or semipersistent SRS configuration to the wireless device.

9. The method according to claim 7, wherein triggering the wireless device to activate the aperiodic or semipersistent SRS configuration comprises transmitting a Downlink Control Information (DCI) trigger or a Medium Access Control Element (MAC CE) to the wireless device.

10. The method according to claim 7, wherein triggering the wireless device to activate the aperiodic or semipersistent SRS configuration comprises triggering the wireless device to activate the aperiodic or semipersistent SRS configuration according to the activation-time recommendation.

* * * * *